United States Patent
Tada

(10) Patent No.: US 8,493,215 B2
(45) Date of Patent: Jul. 23, 2013

(54) COMMUNICATION ANTENNA, RFID TAG, NON-CONTACT COMMUNICATION DEVICE, AND NON-CONTACT COMMUNICATION METHOD

(75) Inventor: Nobuyuki Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 585 days.

(21) Appl. No.: 12/641,331

(22) Filed: Dec. 18, 2009

(65) Prior Publication Data

US 2010/0164726 A1 Jul. 1, 2010

(30) Foreign Application Priority Data

Dec. 26, 2008 (JP) ................................. 2008-334495

(51) Int. Cl.
*G08B 13/14* (2006.01)
(52) U.S. Cl.
USPC ....................................... 340/572.7; 343/803
(58) Field of Classification Search
USPC ..................... 340/572.7, 572.6, 572.8, 568.1; 343/725–730, 793, 795, 803
See application file for complete search history.

(56) References Cited

U.S. PATENT DOCUMENTS

| | | | | |
|---|---|---|---|---|
| 5,682,143 A | * | 10/1997 | Brady et al. ................ | 340/572.7 |
| 7,225,992 B2 | * | 6/2007 | Forster ....................... | 340/572.7 |
| 7,427,957 B2 | * | 9/2008 | Zeinolabedin Rafi et al. ............................ | 343/770 |
| 7,538,738 B2 | * | 5/2009 | Kai et al. ..................... | 343/803 |
| 7,804,411 B2 | * | 9/2010 | Copeland ................... | 340/572.7 |
| 7,928,921 B2 | * | 4/2011 | Kai et al. ..................... | 343/803 |
| 2009/0033462 A1 | | 2/2009 | Kitayoshi et al. | |
| 2010/0283694 A1 | * | 11/2010 | Kato ............................ | 343/730 |

FOREIGN PATENT DOCUMENTS

| | | |
|---|---|---|
| JP | 2004-220141 A | 8/2004 |
| JP | 2005-278139 | 10/2005 |
| JP | 2005-284331 A | 10/2005 |
| JP | 2005-328259 A | 11/2005 |
| JP | 2008-519500 T | 6/2008 |

OTHER PUBLICATIONS

Partial English language translation of the following: Office action dated Oct. 2, 2012 from the Japanese Patent Office in a Japanese patent application corresponding to the instant patent application. This office action translation is submitted now in order to supplement the understanding of patent document JP 2005-278139 which is cited in the office action and is being disclosed in the instant Information Disclosure Statement.

* cited by examiner

*Primary Examiner* — John A Tweel, Jr.
(74) *Attorney, Agent, or Firm* — SOLARIS Intellectual Property Group, PLLC

(57) ABSTRACT

A communication antenna has a rectangular radiating section, and has a structure that emits an electric field of linear polarized waves only in a vicinity of the radiating section of the antenna. An RFID tag has an IC chip and a tag antenna that is long in a predetermined direction. The tag antenna has a main antenna portion that is rectilinear and extends over substantially an entire length in a longitudinal direction of the tag antenna, and folded-over antenna portions at which currents induced by an external electric field offset one another due to portions that extend in mutually different orientations in the longitudinal direction. A parallel interval between the main antenna portion and a first folded-over antenna portion exceeds a width of the radiating section of the communication antenna.

8 Claims, 16 Drawing Sheets

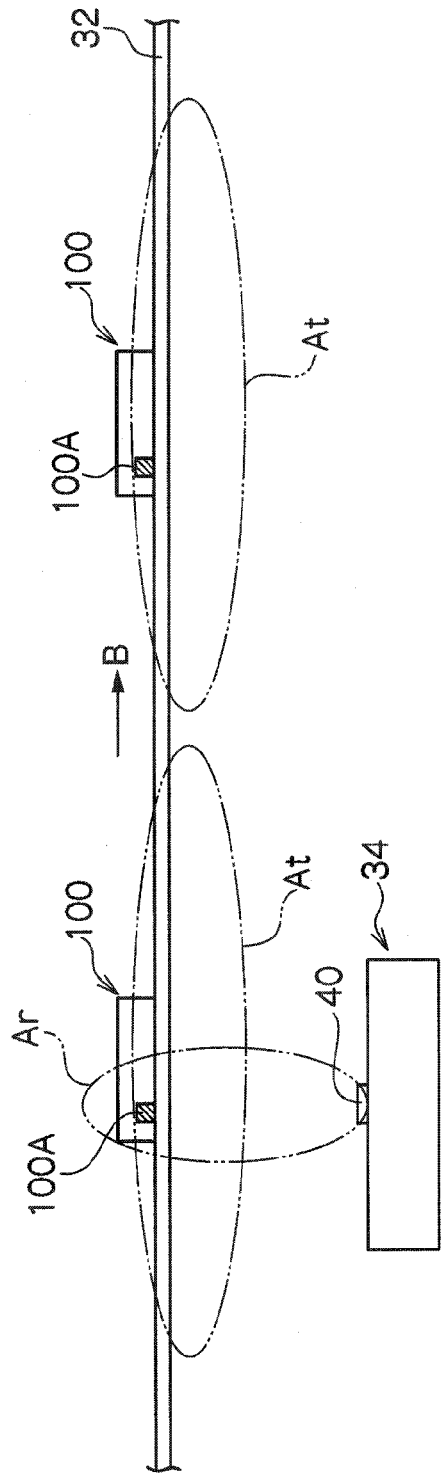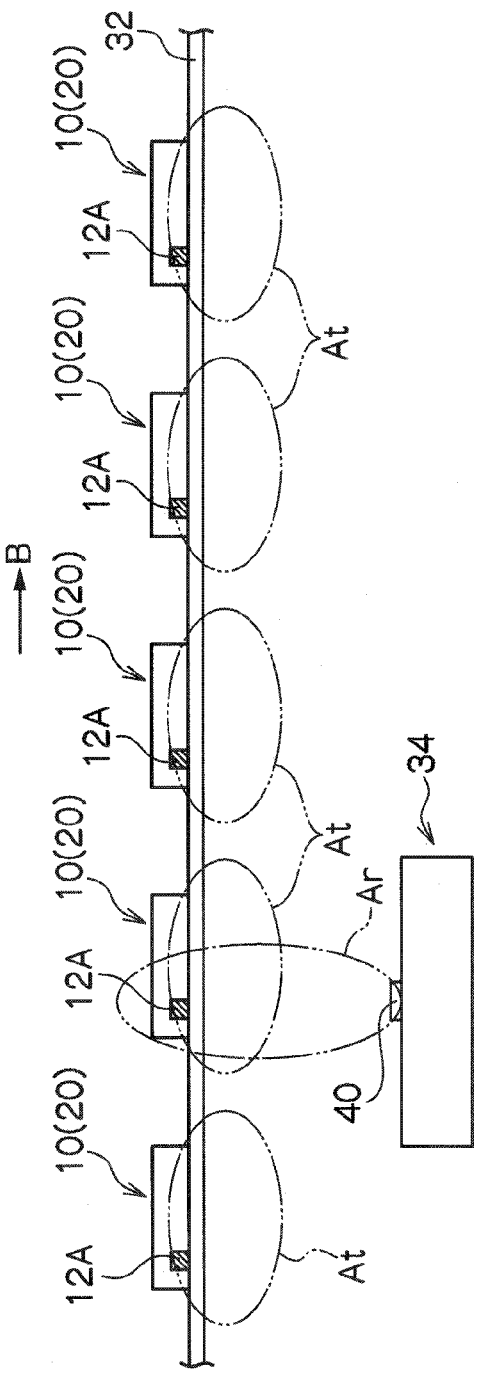

COMMUNICATION ANTENNA, RFID TAG, NON-CONTACT COMMUNICATION DEVICE, AND NON-CONTACT COMMUNICATION METHOD

CROSS-REFERENCE TO RELATED APPLICATION

This application claims priority under 35 USC 119 from Japanese Patent Application No. 2008-334495 filed on Dec. 26, 2008, the disclosure of which is incorporated by reference herein.

BACKGROUND OF THE INVENTION

1. Field of the Invention

The present invention relates to a communication antenna, an RFID tag that is communicated by the communication antenna, a non-contact communication device and a non-contact communication method.

2. Description of the Related Art

Various types of measures have been thought of for making a single RFID tag be the object of communication when plural RFID tags are formed in parallel in a transverse direction on an insulating substrate such as a film or the like and communication is carried out for inspection or the like while these plural RFID tags are conveyed in order (see, for example, Japanese National Publication No. 2008-519500, and Japanese Patent Applications Laid-Open (JP-A) Nos. 2005-284331, 2004-220141, and 2005-328259). The technique of Japanese National Publication No. 2008-519500 makes an antenna for carrying out communication with an RFID tag be a near field microstrip antenna. The technique disclosed in JP-A No. 2005-284331 varies the conveying path of a continuous sheet such that, among plural non-contact IC labels that are formed in the form of a continuous sheet, only the non-contact IC label that is the object of communication faces an antenna for communication. In the technique disclosed in JP-A No. 2004-220141, a radio wave absorbing plate having a slit is disposed between an antenna for communication and plural IC inlets that are formed on an insulating film, and the antenna for communication is made to communicate with only a specific IC inlet through the slit of the radio wave absorbing plate. In the technique disclosed in JP-A No. 2005-328259, due to the arrangement of a reflecting means, that reflects radio waves radiated from an antenna, and a conveying path of RF tags with respect to the antenna, radio waves having high electric field intensity are provided to a specific RF tag from the reflecting means.

However, there is room for further improvement in carrying out communication individually with respect to plural RFID tags.

SUMMARY OF THE INVENTION

The present invention provides a communication antenna and an RFID tag at which it is easy to limit a range at which communication is possible in short-distance communication, and a non-contact communication device that is equipped with the communication antenna and can carry out short-distance communication with a specific RFID tag, and a non-contact communication method that uses the communication antenna and can carry out short-distance communication with a specific RFID tag.

A communication antenna relating to a first aspect of the present invention has a ground layer formed at one surface over substantially the entire surface, and a rectangular radiating section formed in a rectangular shape that is long in a predetermined direction at another surface, and having, at a substantially central portion in the longitudinal direction, a single feed point that is conductive via the ground layer. The communication antenna is formed overall in a flat-plate-shape. A width of the radiating section in a direction forming a right angle with the longitudinal direction of the radiating section is greater than or equal to 0.3 mm and less than 10 mm. An interval between the radiating section and the ground layer is greater than or equal to $1/512$ and less than $1/64$ of a wavelength of radio waves used in communication. The communication antenna is for carrying out communication with an RFID tag.

In the communication antenna of the first aspect of the present invention, the predetermined direction, that is the longitudinal direction of the radiating section, functions as a linear polarization plane. Therefore, a range that is narrow in the transverse direction of the radiating section, as compared with the longitudinal direction of the radiating section, is structured to be a region at which communication is possible. Accordingly, at the present communication antenna, in short-distance communication, an electric field is radiated efficiently in the direction in which the linear polarization characteristic is high.

In particular, at the present communication antenna, given that the interval between the radiating section and the ground layer is d and that the wavelength of the communication radio waves is $\lambda$, $d<\lambda/64$, and therefore, the efficiency of radiating an electric field from the radiating section is low and an electric field is radiated only in a vicinity of the radiating section. Thus, the present communication antenna is not suited to long-distance communication exceeding several cm. Therefore, the present communication antenna is suited to communication that is short distance and that uses linearly polarized waves.

In this way, at the communication antenna of the first aspect of the present invention, limiting the range at which communication is possible is easy. Hereinafter, characteristics that are obtained by short-distance communication carried out in combination with the communication antenna of the first aspect of the present invention are described.

An RFID tag relating to a second aspect of the present invention has an element for communication, and a tag antenna that is formed so as to be long overall in a predetermined direction and that, by being formed by being folded-over plural times in the longitudinal direction at both sides in the longitudinal direction so as to be symmetrical with respect to the element for communication, is structured such that a main antenna portion extending in a rectilinear form over substantially an entire length in the longitudinal direction, and folded-over antenna portions at which currents induced by an external electric field offset one another at portions extending in mutually different orientations of the longitudinal direction, are parallel in a transverse direction.

At the RFID tag relating to the second aspect of the present invention, communication is carried out between a partner and the element for communication via the main antenna portion. Here, at the present RFID tag, the main antenna portion, that forms a rectilinear form along substantially the entire length of the longitudinal direction of the tag antenna, forms a transverse direction portion of the tag antenna, and the other portion is made to be the folded-over antenna portions that are folded-over in mutually opposite orientations and at which currents induced by an external electric field offset one another. Therefore, the sensitivity is markedly low as compared with the main antenna portion. Thus, in the present RFID tag, only a vicinity of the extended portion of the main antenna portion in the transverse direction of the tag antenna is a practical sensitivity region. Thus, the reception sensitivity distribution in the transverse direction of the tag antenna has a large difference, and the range at which high sensitivity is obtained is narrow. In particular, this characteristic is markedly exhibited in short-distance communication with the communication antenna of the first aspect of the present invention.

In this way, at the RFID tag relating to the second aspect of the present invention, in short-distance communication, the range at which high sensitivity is obtained in the direction forming a right angle with the longitudinal direction is narrow, and it is easy to limit the communication range in the transverse direction of the tag antenna. Further, by providing the folded-over antenna portions, a resonance frequency of the tag antenna corresponding to the communication frequency can be ensured even when the dimension in the longitudinal direction is limited.

The RFID tag relating to the second aspect of the present invention may be structured to have the main antenna portion extending in a rectilinear form over substantially an entire length in the longitudinal direction at one end side in the transverse direction, first folded-over antenna portions folded-over toward the longitudinal direction central side from longitudinal direction end portions and parallel with the main antenna portion at a first predetermined interval, and second folded-over antenna portions folded-over from the central side in the longitudinal direction toward longitudinal direction end portion sides and parallel with the first folded-over antenna portions at a second predetermined interval that is less than the first predetermined interval, thereby structuring, together with the first folded-over antenna portions, the folded-over antenna portions.

At the RFID tag of the above-described structure, the first folded-over antenna portions that are parallel with the main antenna portion at the first predetermined interval, and the second folded-over antenna portions that are adjacent in the parallel direction at a second predetermined interval that is less than the first predetermined interval, structure the folded-over antenna portions at which currents induced by an external electric field offset one another. It suffices for the same number of the first folded-over antenna portions and second folded-over antenna portions to be provided. Because the first predetermined interval is an interval exceeding the second predetermined interval, the first folded-over antenna portions, that structure the folded-over antenna portions, impeding of communication by the main antenna portion is prevented or effectively suppressed.

At the RFID tag of the above-described structure, the tag antenna may be formed by one of the second folded-over antenna portions being made to be parallel at an interval that is less than the first predetermined interval with respect to the main antenna portion.

In the RFID tag of the above-described structure, the second folded-over antenna portions, that extend toward the end portions sides from the longitudinal direction central side of the tag antenna, are parallel to the main antenna portion at an interval that is less than the first predetermined interval. Therefore, the currents induced by an external electric field of these second folded-over antenna portions and the main antenna portion do not offset one another, and the sum thereof becomes the current that is induced by the external electric field of the sensitivity region. Accordingly, at the present RFID tag, it is easy to limit the range at which communication is possible, by making the sensitivity of a specific portion in the transverse direction of the tag antenna be high.

In the RFID tag relating to the second aspect of the present invention, the second predetermined interval may be less than or equal to two times the width dimension of a radiating section structuring a partner antenna for short-distance communication that is made to be long in the predetermined direction and at whose central portion in the longitudinal direction a single feed point is set.

In the RFID tag of the above-described structure, the longitudinal direction of the tag antenna substantially coincides with the longitudinal direction of the partner antenna, and the second predetermined interval between the first folded-over antenna portions and the second folded-over antenna portions that structure the folded-over antenna portions is parallel so as to be separated by an interval that is less than or equal to two times the width of the radiating section of the partner antenna. Therefore, at the folded-over antenna portions, the currents induced by the electric field that the partner antenna radiates offset one another well at the first and second folded-over antenna portions, and the range at which communication is possible in the transverse direction of the tag antenna can be limited easily.

The RFID tag relating to the second aspect of the present invention may have a loop-shaped antenna portion that commonly has a portion of the main antenna portion, at a central portion of the main antenna portion that extends in a rectilinear form along substantially the entire length in the longitudinal direction, and the element for communication may be on the loop-shaped antenna portion and set at a position that is different than the main antenna portion.

In the RFID tag of the above-described structure, the position of the element for communication with respect to the position of the main antenna portion is offset in the transverse direction of the tag antenna. Due thereto, the position of the element for communication can be disposed so as to be offset with respect to, for example, the sensitivity range of the tag antenna in the transverse direction of the tag antenna.

A non-contact communication device relating to a third aspect of the present invention is a non-contact communication device for carrying out communication in a non-contact state with the RFID tag relating to the second aspect of the present invention, and has the communication antenna relating to the first aspect of the present invention that is disposed such that the longitudinal direction of the radiating section coincides with the longitudinal direction of the main antenna portion of the RFID tag, and a communicating section carrying out communication with the RFID tag via the communication antenna, when the radiating section of the communication antenna is near the tag antenna.

In the non-contact communication device relating to the third aspect of the present invention, in the state in which the longitudinal direction of the radiating section is made to coincide with the longitudinal direction of the tag antenna of the RFID tag, the communicating section carries out communication with the element for communication of the RFID tag via (the radiating section of) the communication antenna. At the RFID tag relating to the second aspect of the present invention, as described above, the sensitivity region in the transverse direction is narrow, and, at the communication antenna relating to the first aspect of the present invention, the region at which communication is possible in the transverse direction is narrow. Therefore, by making the longitudinal directions of these coincide, communication, in which the range at which communication is possible in the transverse direction is narrowed, can be realized. Namely, in the present non-contact communication device, the communicating section can carry out short-distance communication with the element for communication of a specific RFID tag.

In this way, the non-contact communication device relating to the third aspect of the present invention has the above-described communication antenna and can carry out short-distance communication with a specific RFID tag.

The non-contact communication device relating to the third aspect of the present invention may further have a conveying device that conveys plural RFID tags, that are parallel in a transverse direction, such that the plural RFID tags successively pass a region at which communication is possible via the communication antenna, and the communicating section may be structured so as to, via the communication antenna, carry out communication individually with the RFID that passes the region at which communication is possible.

In accordance with the non-contact communication device of the above-described structure, when the plural RFID tags that are conveyed successively by the conveying device pass the region at which the communication antenna is set, a specific RFID tag and the communicating section carry out communication via the communication antenna. Here, in the present non-contact communication device, because the range at which communication is possible in the transverse direction is narrowed as described above, communication with a specific RFID tag among the plural RFID tags that are parallel in the conveying direction (the tag antenna transverse direction) is possible.

In the non-contact communication device of the above-described structure, the communication antenna may be disposed at an incline so as to be oriented toward both an RFID side and a downstream side in a conveying direction by the conveying device.

In this case, because the communication antenna or section is inclined in the above-described direction, erroneous communication (interference of the object of communication) with the RFID that is before passing the region at which communication is possible of the communication antenna (i.e., the RFID that is before communication) is effectively suppressed or prevented.

A non-contact communication method relating to a fourth aspect of the present invention is a non-contact communication method that carries out communication in a non-contact state individually with one of plural RFID tags that each have a tag antenna that is long in a predetermined direction and that are parallel in a transverse direction that forms a right angle with the longitudinal direction, and, with a communication antenna, that has a radiating section that is long in a predetermined direction and at whose substantially central portion in the longitudinal direction a feed point is provided, being in a posture such that the longitudinal direction of the radiating section coincides with a longitudinal direction of the tag antenna, the method causes the radiating section to approach one RFID tag among the plural RFID tags, and carries out communication individually with that one RFID tag.

In the non-contact communication method relating to the fourth aspect of the present invention, the communication antenna, at which the longitudinal direction of the radiating section is made to coincide with the longitudinal directions of tag antennas of RFID tags, is made to approach one RFID tag of the plural RFID tags that are parallel in the transverse direction. Because the longitudinal direction of the radiating section of the communication antenna is made to be a linear polarization plane, a narrow range in the transverse direction of the radiating section is structured to be the region where communication is possible. Accordingly, in the present non-contact communication method, by overlapping the region at which communication is possible of the communication antenna and the sensitivity region of a specific RFID tag, communication with that RFID tag is possible.

In this way, in the non-contact communication method relating to the fourth aspect of the present invention, short-distance communication can be carried out with a specific RFID tag by using the above-described communication antenna.

As described above, the RFID tag and communication antenna relating to the present invention have the excellent effect of easily narrowing the range at which communication is possible in short-distance communication.

Further, the non-contact communication device and method relating to the present invention have the excellent effect of being able to carry out short-distance communication with a specific RFID tag by using the above-described communication antenna.

BRIEF DESCRIPTION OF THE DRAWINGS

FIG. 2A is a perspective view seen from one side from a radiating section side, FIG. 2B is a perspective view seen from a ground layer side, and FIG. 2C is a cross-sectional view along line 2C-2C of FIG. 2B;

FIG. 7A is a graph showing the sensitivity range of a comparative example of FIG. 15A through FIG. 15C, FIG. 7B is a graph showing the sensitivity range of a comparative example of FIG. 16A through FIG. 16C, FIG. 7C is a graph showing the sensitivity range of the first exemplary embodiment, and FIG. 7D is a graph showing the sensitivity range of a second exemplary embodiment;

FIG. 8A and FIG. 8B are drawings for comparing the sensitivity ranges of the first exemplary embodiment of the present invention and a comparative example, where FIG. 8A is a side view schematically showing the sensitivity range of the comparative example, and FIG. 8B is a side view schematically showing the sensitivity range of the first exemplary embodiment;

FIG. 9A is a front view showing an example offset 10 mm toward the minus side with respect to the radiating section of the reader/writer antenna, FIG. 9B is a front view showing an example that is not offset with respect to the radiating section of the reader/ writer antenna, and FIG. 9C is a front view showing an example offset 10 mm toward the plus side with respect to the radiating section of the reader/writer antenna;

FIG. 11A is a front view showing an example offset 10 mm toward the minus side with respect to the radiating section of the reader/writer antenna, FIG. 11B is a front view showing an example that is not offset with respect to the radiating section of the reader/writer antenna, and FIG. 11C is a front view showing an example offset 10 mm toward the plus side with respect to the radiating section of the reader/writer antenna;

FIG. 15A is a front view showing an example offset 10 mm toward the minus side with respect to the radiating section of the reader/writer antenna, FIG. 15B is a front view showing an example that is not offset with respect to the radiating section of the reader/writer antenna, and FIG. 15C is a front view showing an example offset 10 mm toward the plus side with respect to the radiating section of the reader/writer antenna;

FIG. 16A is a front view showing an example offset 10 mm toward the minus side with respect to the radiating section of the reader/writer antenna, FIG. 16B is a front view showing an example that is not offset with respect to the radiating section of the reader/writer antenna, and FIG. 16C is a front view showing an example offset 10 mm toward the plus side with respect to the radiating section of the reader/writer antenna.

DETAILED DESCRIPTION OF THE INVENTION

An RFID tag 10 relating to a first exemplary embodiment of the present invention, and a reader/writer system 36 serving as a non-contact communication device to which is applied a reader/writer antenna 34 serving as a communication antenna for communicating with the RFID tag 10, will be described on the basis of FIG. 1 through FIG. 8B. First, the schematic structure, the use (an application example), and a summary of a part of the manufacturing process of the RFID tag 10 will be described. Then, a tag antenna 12 of the RFID tag 10 and the reader/writer antenna 34, that are main portions of the present invention, will be described.

Figure 1:
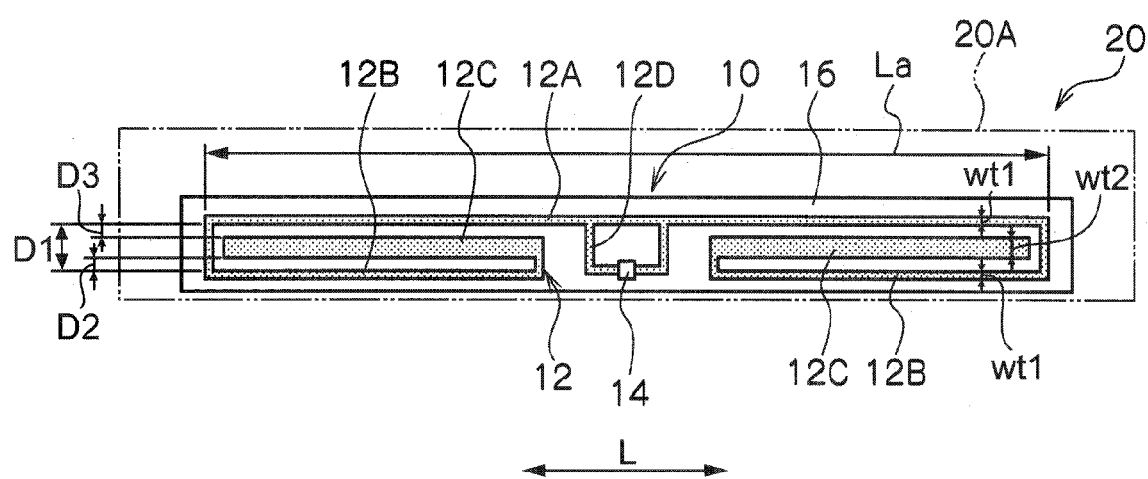
FIG. 1 is a front view showing an RFID tag relating to a first exemplary embodiment of the present invention.

The schematic overall structure of the RFID tag (an abbreviation for Radio Frequency IDentification tag, also called RF tag or IC tag) 10 is showing in a front view in FIG. 1. As shown in FIG. 1, the RFID tag 10 is structured with the main portions thereof being an IC chip 14 serving as an element for communication, a tag antenna 12 for the IC chip 14 to carry out wireless (non-contact) communication by radio waves of a specific frequency f, and a base sheet 16 serving as a base portion for holding them. The tag antenna 12 is long in a specific direction (the arrow L direction in FIG. 1), and is structured as a type of a so-called dipole antenna that is formed to be symmetrical (so as to have line symmetry) with respect to (a longitudinal direction central line that passes through) the IC chip 14.

Although the shape thereof will be described in detail later, the tag antenna 12 is folded-over plural times in the longitudinal direction thereof, and the total extended length thereof is determined in accordance with a wavelength λ of the radio waves of the aforementioned specific frequency f. Specifically, even when, for example, the communication frequency is 960 MHz of the usage band (860 MHz to 960 MHz) of the RFID tag and a longitudinal direction dimension La of the antenna shown in FIG. 1 is La=72 mm, a total extended length Lt of the tag antenna 12 is Lt≈156.3 mm (λ/2). Note that, because the total extended length Lt is affected by a dielectric layer that is formed from a base sheet and other structural members, the total extended length Lt is generally a length that is shorter than the aforementioned value.

Figure 5:
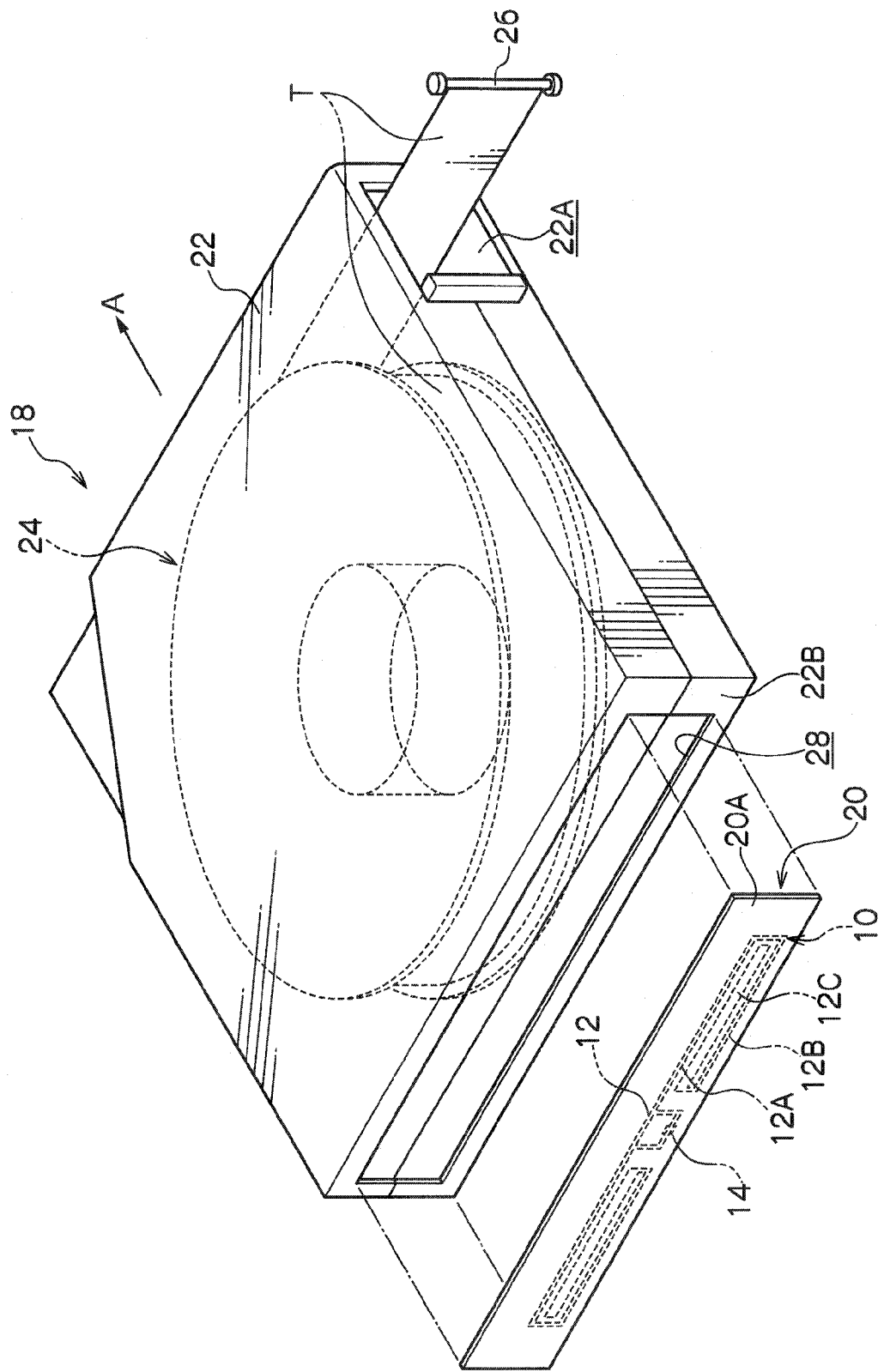
FIG. 5 is a perspective view showing the label, that the RFID tag relating to the first exemplary embodiment of the present invention has been converted into, and a recording tape cartridge to which the label has been applied.

In the present exemplary embodiment, as shown in FIG. 5, the RFID tag 10 is embedded in a label sheet 20A that is affixed to a recording tape cartridge 18, and structures a label 20. The label 20 is for information that can be seen by a user, such as characters or symbols or the like, to be printed or handwritten thereon. Information that was expressed by, for example, a conventional barcode label or the like, and information for centrally managing the individual cartridge at the time of storage or the time of conveying and usage by an autoloader (management that considers the relationship with the contents recorded on a magnetic tape T), are read from and written to the RFID tag 10 that is embedded in the label 20.

To further describe the recording tape cartridge 18, the recording tape cartridge 18 is structured such that the magnetic tape T that is an information recording medium is wound around a single reel 24 that is rotatably accommodated within a flat case 22. When the recording tape cartridge 18 is loaded into a drive device in the direction of arrow A, a window portion 22A formed at the leading side in the loading direction is opened, and a leader member (a leader pin in the drawing) 26 provided at the leading end of the magnetic tape T is pulled-out from the window portion 22A by the drive device. The magnetic tape T is thereby led along a predetermined tape path within the drive device, and reading and writing of information from and to the magnetic tape T are carried out. In the present exemplary embodiment, the recording tape cartridge 18 is used for backing-up data of a computer.

The label 20 is affixed to a label area 28 that is recessed at a rear surface 22B of the case 22 of the recording tape cartridge 18, which rear surface 22B is at the side opposite arrow A. The label area 28 is provided so as to extend over substantially the entire region of the rear surface 22B of the case 22, and, in rear view, forms a rectangular shape whose long sides run along the transverse direction of the flat case 22 and whose short sides run along the direction of thickness. When not in use, the recording tape cartridge 18 is stored such that the label 20 affixed to the label area 28 is exposed.

For example, when numerous recording tape cartridges 18 are used for back-up, an unillustrated library device is used that is structured from a holder, that stores the numerous recording tape cartridges 18, and an autoloader, that automatically loads and removes the recording tape cartridges 18 into and from drive devices. The plural recording tape cartridges 18 that are individually held at the holder of the library device are parallel at a uniform interval in the direction of thickness with the labels 20 thereof exposed. On the other hand, when the number of recording tape cartridges 18 being used is not large enough to use a library device, there are cases in which the recording tape cartridges 18 are stored by being directly superposed one on another (layered or stacked).

Figure 3:
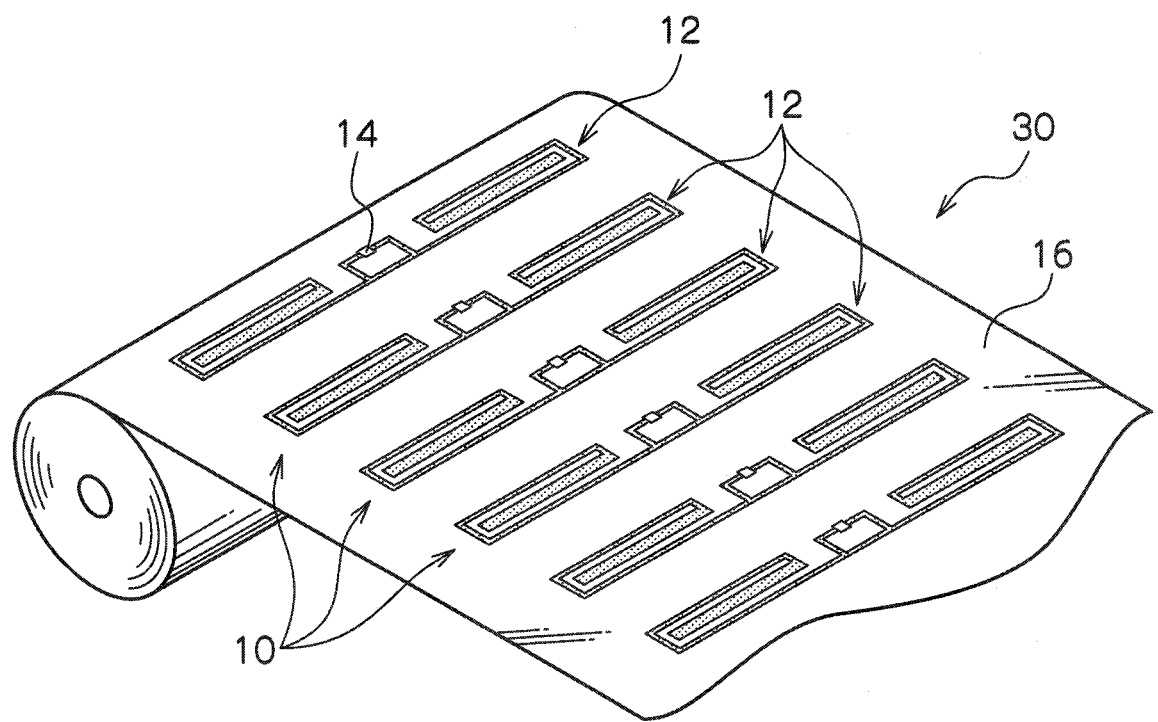
FIG. 3 is a perspective view showing an inlay of the RFID tags relating to the first exemplary embodiment of the present invention.

As shown in FIG. 3, the above-described RFID tag 10 is obtained by cutting and separating a base sheet 16 from an inlay (also called an inlet) 30 that is formed so as to be parallel in the transverse direction on the base sheet 16 that forms a roll. Further, as shown in FIG. 4, the labels 20 are structured by converting the RFID tags 10 that are separated from the inlay into the label sheets 20A that are parallel in the transverse direction, peelably via an adhesive, on a mount sheet 32 that is a release sheet forming a roll shape.

In the state of the inlay 30 or in a state of being converted into the labels 20 on the mount sheet 32, i.e., in the state of being parallel along the transverse direction on the rolled base sheet 16 or the mount sheet 32, individual information for differentiating the RFID tags 10 from the other RFID tags 10 is provided to (the IC chips 14 of) the plural RFID tags 10 (hereinafter called "initialization"). In the present exemplary embodiment, as shown in FIG. 4, the RFID tags 10 are initialized in a state of being converted into the labels 20 on the mount sheet 32.

Figure 4:
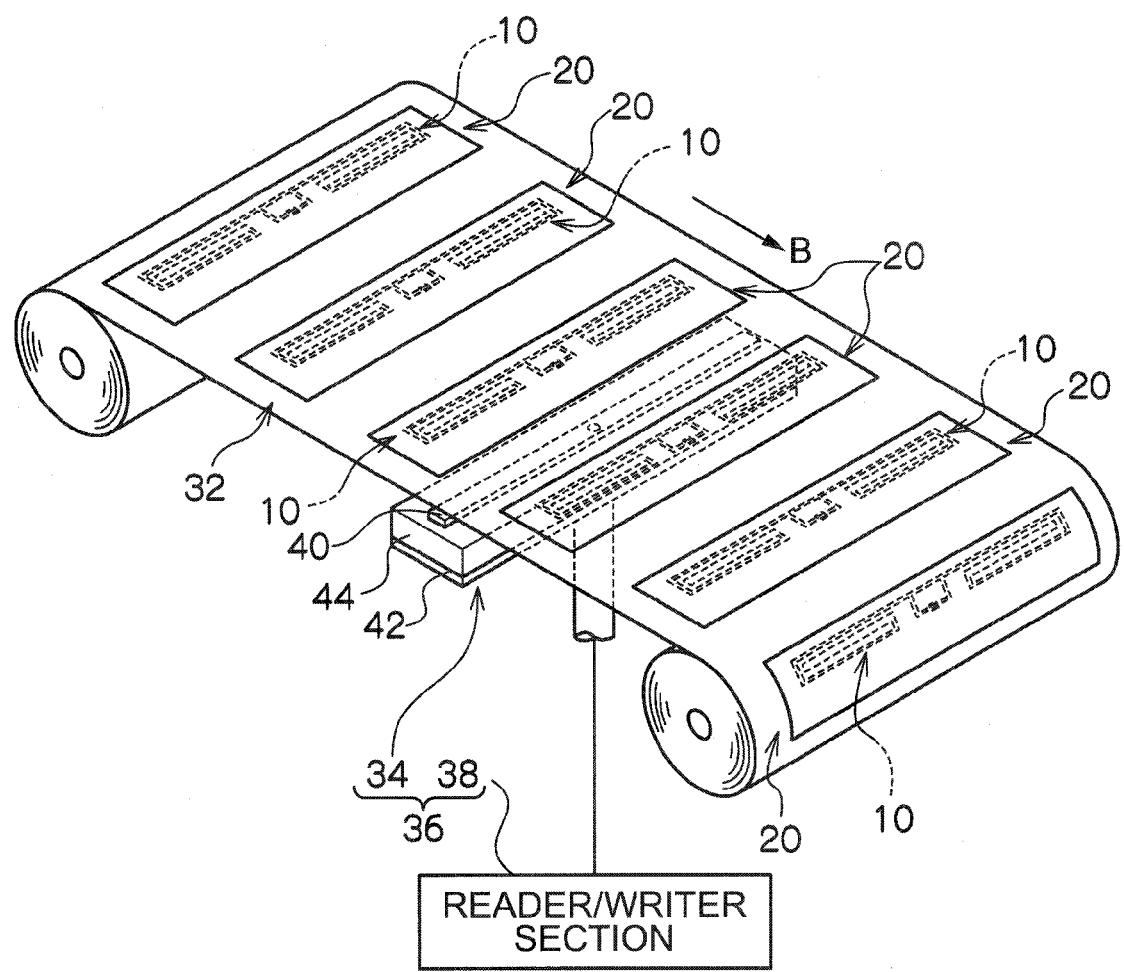
FIG. 4 is a perspective view showing labels, that the RFID tags relating to the first exemplary embodiment of the present invention have been converted into, and the reader/writer system.

As shown in FIG. 4, this initialization is carried out by a reader/writer section 38, that serves as a communicating section and that, together with a reader/writer antenna 34, structures the reader/writer system 36, communicating wirelessly (in a state of non-contact) over a short distance individually with the respective RFID tags 10 via the reader/writer antenna 34 that serves as a communication antenna, while the mount sheet 32, that can be understood as structuring a portion of a conveying device, is conveyed along the longitudinal direction, i.e., the transverse direction of the labels 20 (refer to arrow B in FIG. 4).

The tag antennas 12 of the RFID tags 10 and the reader/writer antenna 34 of the reader/writer system 36 are structured such that the wireless communication between the reader/writer system 36 and the RFID tag 10 that is the object of initialization does not affect the other RFID tags 10. Hereinafter, the reader/writer antenna 34 and the tag antenna 12 will be described concretely in that order.

(Structure of Reader/Writer Antenna)

Figure 2A:
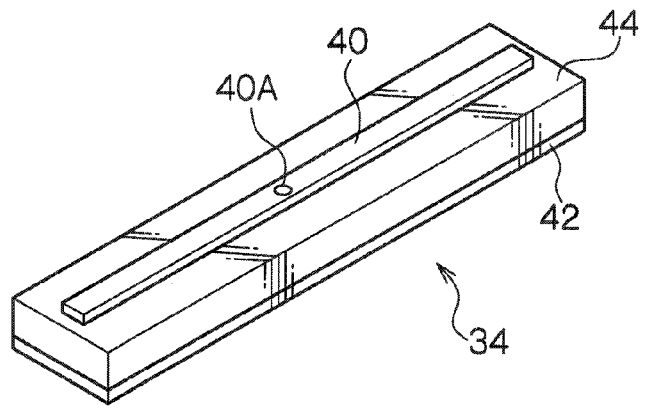
FIG. 2A through FIG. 2C are drawings showing a reader/writer antenna of a reader/writer system relating to the first exemplary embodiment of the present invention, where
Figure 2B:
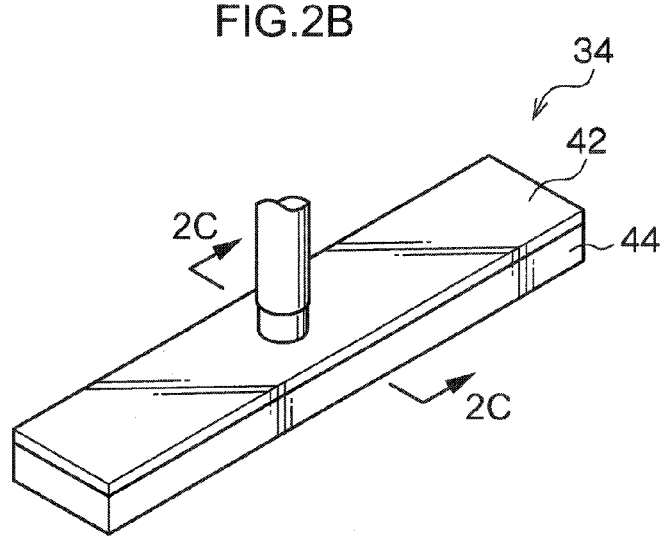
Figure 2C:
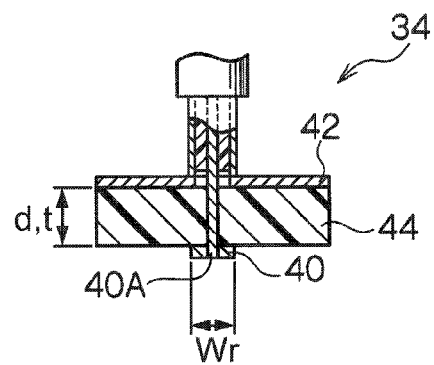

FIG. 2A is a perspective view viewing the reader/writer antenna 34 from a radiating section 40 side, FIG. 2B is a perspective view viewing the reader/writer antenna 34 from a ground layer 42 side, and FIG. 2C is a cross-sectional view along line 2C-2C of FIG. 2B. As shown in these drawings, at the reader/writer antenna 34, a dielectric layer 44 is formed between the radiating section 40 and the ground layer 42. In the present exemplary embodiment, the reader/writer antenna 34 is structured by forming the radiating section 40 in the needed shape by etching or the like by using a heat-resistant glass substrate—epoxy resin layered plate on whose both surfaces copper foil is formed (FR4 grade of the National Electronics Manufacturers Association (NEMA)).

More specifically, the ground layer 42 is formed by leaving the copper foil at the entire surface of one surface of the dielectric layer 44, and the radiating section 40 is formed by leaving the copper foil in the shape of a straight line that is long along a predetermined direction. In the present exemplary embodiment, the reader/writer antenna 34 (the ground layer 42, the dielectric layer 44) is formed on the whole in the shape of a rectangle that is long along a predetermined direction. The radiating section 40 is formed over the entire length in the longitudinal direction at a transverse direction central portion of the reader/writer antenna 34. Note that the ground layer 42 does not necessarily have to be formed on the entire surface of one surface, and it suffices that the ground layer 42 be structured as a surface that includes at least an equivalent dimension facing and overlapping the radiating section 40 (a range such that the radiating section 40 overlaps over the entire surface thereof, as seen in the direction of thickness).

In the same way as the above-described tag antenna 12, the length of the radiating section 40 is set on the basis of the wavelength λ of the communication radio waves. In the present exemplary embodiment in which the dielectric constant of the dielectric layer 44 is 4 to 4.5 by using the above-described FR4 substrate, the antenna length that is optimal for a frequency f=960 MHz of the communication radio waves is set as 88 mm (a case in which the respective dimensions described hereinafter are utilized). This antenna length is much shorter than the total extended length Lt of the tag antenna 12, and is longer than the longitudinal direction length La of the tag antenna 12 itself but is small as compared with the width of the recording tape cartridge 18 (the label 20). Further, a width Wr of the radiating section 40 is preferably less than or equal to 10 mm, and 0.3 mm to 3 mm is more preferable. In the present exemplary embodiment, the width Wr=2 mm. Further, in the present exemplary embodiment, the width of the ground layer 42 is made to be 14 mm.

The point at the substantially central portion in the longitudinal direction of the radiating section 40 is a feed point 40A. Note that the position of the feed point 40A in the longitudinal direction of the radiating section 40 is set such that impedance matching between the antenna and the electricity-supplying side can be obtained, and there are cases in which it is set so as to be offset from the longitudinal direction central portion of the radiating section 40. Due thereto, the reader/writer antenna 34 in the present exemplary embodiment can be understood as being a type of a so-called patch antenna, and, in particular, can be understood as being a special patch antenna having a linear polarization plane in the longitudinal direction of the radiating section 40. Further, between the feed point 40A and the ground layer 42 is insulated by the dielectric layer 44.

Moreover, at the reader/writer antenna 34, an interval d between the radiating section 40 and the ground layer 42 that is prescribed by a thickness t of the dielectric layer 44 is set so as to satisfy $\lambda/512 \leqq d < \lambda/64$. For example, if the communication frequency is 960 MHz, d is substantially $0.6 \leqq d < 4.9$ mm. In the present exemplary embodiment, the interval d is set to d=1.6 mm. Here, at a patch antenna, good radiating efficiency is maintained by setting the interval d between the radiating section and the ground layer to be from $\lambda/64$ to $\lambda/16$. However, by making the interval d be $d<\lambda/64$, the reader/writer antenna 34 is structured such that the radiating efficiency thereof is lowered and such that it is specialized for short-distance communication applications. On the other hand, in consideration of the fact that the electric field radiating efficiency as an antenna greatly deteriorates if the thickness of the dielectric layer 44 is made to be very thin, in order to satisfy the functions of an antenna, the lower limit of the interval d is set to $\lambda/512$.

To summarize the above, the reader/writer antenna 34 has a linear polarization plane in the longitudinal direction of the radiating section 40, and the transverse dimension is suppressed, and the radiating efficiency is decreased. Therefore, the reader/writer antenna 34 is structured such that the distance over which communication is possible is short. For example, if the transmission output of the writer section 38 is made to be 5 dBm, the communication distance is substantially 5 mm under optimal conditions.

(Structure of Antenna of RFID Tag)

As shown in FIG. 1, in order to ensure the above-described total extended length Lt, the tag antenna 12 is folded-over plural times in the longitudinal direction so as to form a meander line structure in the longitudinal direction. Concretely, the tag antenna 12 has a main antenna portion 12A that forms a rectilinear shape along the entire longitudinal direction length of the tag antenna 12, a pair of first folded-over antenna portions 12B that are folded-over from the longitudinal direction both ends of the main antenna portion 12A respectively toward the longitudinal direction central side so as to be parallel in the transverse direction to the main antenna portion 12A, and a pair of second folded-over antenna portions 12C that are folded-over from the end portions of the pair of first folded-over antenna portions 12B toward the longitudinal direction end portion sides of the tag antenna 12 so as to be parallel to the corresponding first folded-over antenna portion 12B along the entire length.

A parallel interval D1 (first predetermined interval) between the main antenna portion 12A and the first folded-over antenna portion 12B is set to be an interval that exceeds a parallel interval D2 (second predetermined interval) between the first folded-over antenna portion 12B and the second folded-over antenna portion 12C (D1>D2). In the present exemplary embodiment, the parallel interval D1 is set as an interval exceeding the width Wr of the radiating section 40 that structures the reader/writer antenna 34 (D1>Wr). On the other hand, the parallel interval D2 between the first folded-over antenna portion 12B and the second folded-over antenna portion 12C is set to be greater than or equal to 0.2 mm, and so as to be less than or equal to twice the width Wr of the radiating section 40 (D2≦2×Wr). It is preferable to set the parallel interval D2 to be less than or equal to the width Wr of the radiating section 40 (D2≦Wr), and in the present exemplary embodiment, D2≈Wr/2. Due thereto, when the tag antenna 12 receives irradiation of radio waves, the currents that are induced by external electric field at the first folded-over antenna portions 12B and second folded-over antenna portions 12C, that extend in opposite orientations in the longitudinal direction, offset one another. Accordingly, the first folded-over antenna portions 12B and the second folded-over antenna portions 12C at an antenna 1 structure folded-over antenna portions of the present invention. Further, at the tag antenna 12, because the parallel interval D1 exceeds the parallel interval D2 (D1>D2) as described above, the induced currents of the first folded-over antenna portions 12B at the time when the induced current of the main antenna portion 12A becomes a maximum with respect to the electric field generated by the reader/writer antenna 34, substantially do not affect the induced current of the main antenna portion 12A.

In the present exemplary embodiment, the pair of second folded-over antenna portions 12C are respectively folded-over inwardly in the transverse direction of the tag antenna 12, i.e., toward the main antenna portion 12A, and a parallel interval D3 between the main antenna portion 12A and the second folded-over antenna portion 12C is made to be less than the aforementioned parallel interval (D3<D1). In the present exemplary embodiment, the parallel interval D3 is set to be less than or equal to the width Wr of the radiating section 40 (D3≦Wr). Further, at the tag antenna 12, a width Wt2 of the second folded-over antenna portion 12C is made to be large as compared with a width Wt1 of the main antenna portion 12A, the first folded-over antenna portion 12B (Wt2>Wt1). Due thereto, the Q factor of the tag antenna 12 is small, i.e., the resonance frequency sensitivity distribution whose center is the communication frequency f is wide.

A loop-shaped antenna portion 12D is provided at the longitudinal direction central portion of the tag antenna 12. The loop-shaped antenna portion 12D is disposed between the pairs of first folded-over antenna portions 12B, second folded-over antenna portions 12C, i.e., at the longitudinal direction central portion of the antenna 12. In the present exemplary embodiment, the IC chip 14 is disposed at the loop-shaped antenna portion 12D. As shown in FIG. 1 and FIG. 5, the RFID tag 10 occupies one transverse direction side (substantially half) of the label 20, and is embedded in the label 20 such that the side at which the IC chip 14 is disposed is positioned at a transverse direction end portion side of the label 20.

Next, operation of the present exemplary embodiment will be described.

In the state in which the RFID tags 10 of the above-described structure are converted into the labels 20 that are parallel on the mount sheet 32 from the inlay 30, the RFID tags 10 are initialized by the reader/writer system 36. Namely, while the mount sheet 32 is driven in the arrow B direction, the reader/writer system 36 communicates in a non-contact manner individually with the respective RFID tags 10 via the reader/writer antenna 34 whose longitudinal direction coincides with that of the respective labels 20 on the mount sheet 32. Information for individuating is thereby written to the respective RFID tags 10.

Here, at the reader/writer system 36, radio waves are radiated from the radiating section 40 whose longitudinal direction substantially coincides with the longitudinal direction of the tag antenna 12. Therefore, the radio waves become linear polarized waves whose polarization direction substantially coincides with the longitudinal direction of the radiating section 40. Further, because the interval d between the radiating section 40 and the ground layer 42 that structure the reader/writer antenna 34 is d<λ/64, the radiating efficiency is low, and a region Ar at which communication is possible is narrow.

On the other hand, when the RFID tag 10 receives the electric field radiated from the reader/writer antenna 34, mainly the main antenna portion 12A is activated. Namely, at the parallel regions of the first folded-over antenna portions 12B and the second folded-over antenna portions 12C at the tag antenna 12, the first folded-over antenna portions 12B and the second folded-over antenna portions 12C are folded-over in opposite orientations in the longitudinal direction, and are parallel at the parallel interval D2 that is less than or equal to the width Wr of the radiating section 40. Therefore, currents induced by an external electric field negate each other (offset one another), and the first folded-over antenna portions 12B and the second folded-over antenna portions 12C are made inactive. Accordingly, at the tag antenna 12, as described above, mainly the main antenna portion 12A is activated.

Further, at the tag antenna 12, the main antenna portion 12A and the second folded-over antenna portions 12C, that extend in the same direction, are parallel at the parallel interval D2 that is less than or equal to the width Wr of the radiating section 40. Therefore, in a vicinity of the main antenna portion 12A in the transverse direction, the current induced by the external electric field becomes the sum of the currents induced by the external electric fields of the main antenna portion 12A and the second folded-over antenna portions 12C, and the reception sensitivity improves.

For these reasons, communication between the RFID tags 10, that are embedded in the plural labels 20 that are parallel in the transverse direction on the mount sheet 32, and the reader/writer section 38 via the reader/writer antenna 34 is carried out only when the RFID tag 10 passes above the radiating section 40 of the reader/writer antenna 34. Namely, only the RFID tag 10 that is the object of initialization is initialized by communication with the reader/writer section 38, and erroneous communication (interference) with the other RFID tags 10 is prevented or effectively suppressed.

Figure 14:
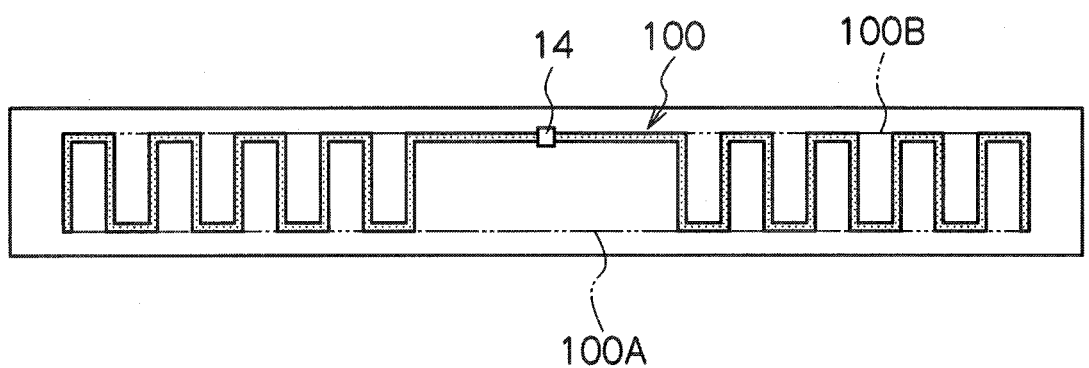
FIG. 14 is a front view showing an RFID tag relating to the exemplary embodiments of the present invention and the comparative examples.

For example, an antenna 100 relating to a comparative example and shown in FIG. 14 is folded-over plural times in the transverse direction of the antenna 100 and forms a meander line structure in the transverse direction. At this antenna 100, when a transverse direction one end portion 100A passes the radiating section 40 of the reader/writer antenna 34, that transverse direction one end portion 100A is activated. When a transverse direction other end portion 100B passes the radiating section 40 of the reader/writer antenna 34, that transverse direction other end portion 100B is activated. Namely, at the antenna 100, the sensitivity distribution in the transverse direction at the RFID side is wide in the conveying direction of the labels. Therefore, in order to avoid, of RFIDs that are adjacent to one another in the conveying direction, the one end portion 100A of one and the other end portion 100B of the other both being activated, the parallel interval of the labels (RFIDs) that are adjacent to one another in the conveying direction must be set to be large.

In contrast, at the RFID tag 10, as described above, only a vicinity portion of the main antenna portion 12A, that is one side in the transverse direction of the tag antenna 12, is activated. Therefore, as compared with an RFID that is equipped with the antenna 100 relating to the comparative example of FIG. 14, the parallel interval of labels (RFIDs) that are adjacent to one another in the conveying direction can be set to be small.

This point will be discussed further while referring to the results of numerical analysis shown in FIG. 7A through FIG. 7D. FIG. 7A through FIG. 7D show reception strengths (dB) with respect to offset amounts in the transverse (conveying direction) of the antenna with respect to the radiating section 40 in the exemplary embodiments of the present invention and the comparative examples. The solid lines in the respective drawings show results of analysis when the distance in the radio wave radiating direction (the direction of thickness of the radiating section 40) with respect to the radiating section 40 of the reader/writer antenna 34 is 5 mm, and the dashed lines show the results of analysis when this distance is 10 mm. From these results of analysis, the range of offset amounts, at which strengths of within 3 dB from the peak of the reception strength are obtained, is a sensitivity region At.

Figure 7A:
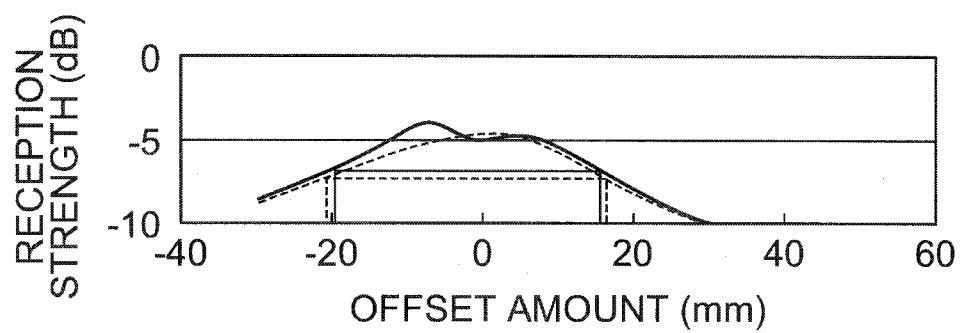
FIG. 7A through FIG. 7D are drawings showing the results of numerical analysis of sensitivity ranges of RFID tags of exemplary embodiments of the present invention and comparative examples, where
Figure 7B:
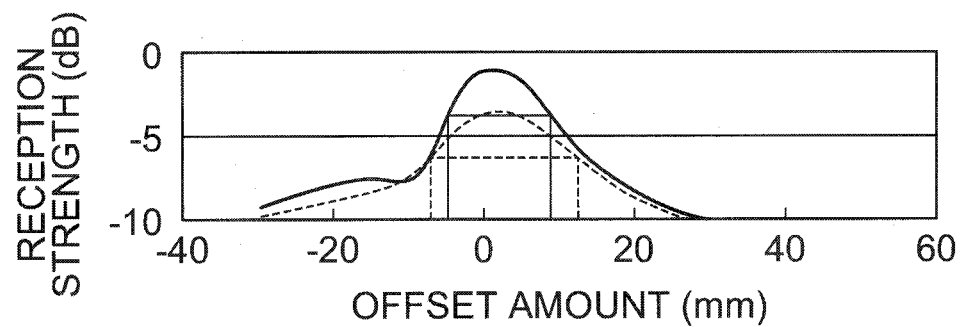
Figure 7C:
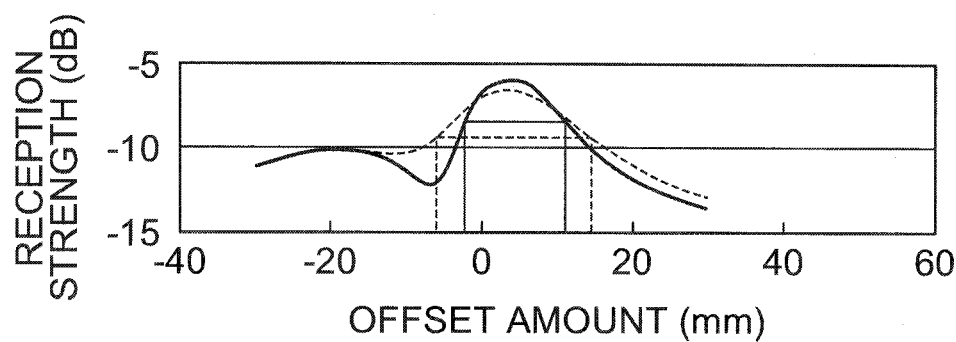
Figure 7D:
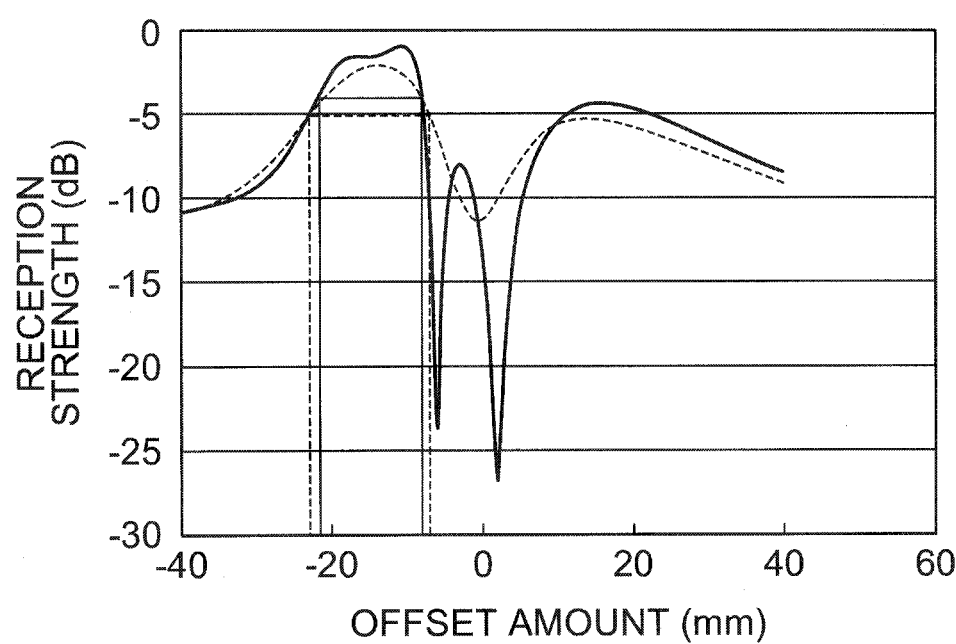
Figure 9A:
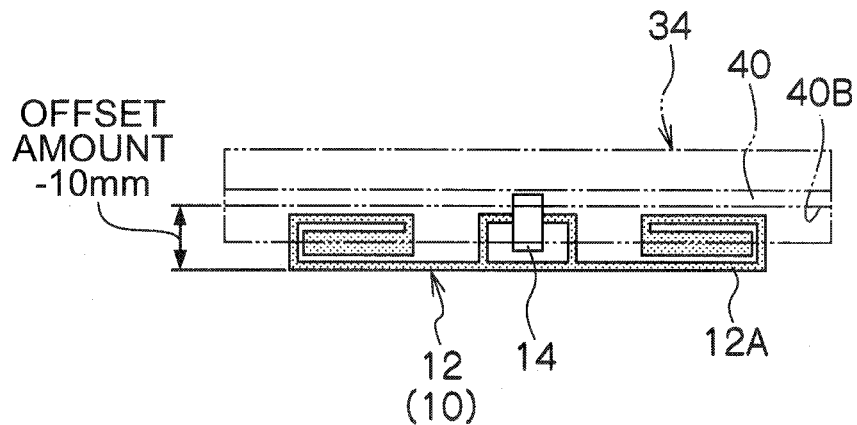
FIG. 9A through FIG. 9C are drawings showing models of the first exemplary embodiment of the present invention using the numerical analysis of FIG. 7C, where
Figure 9B:
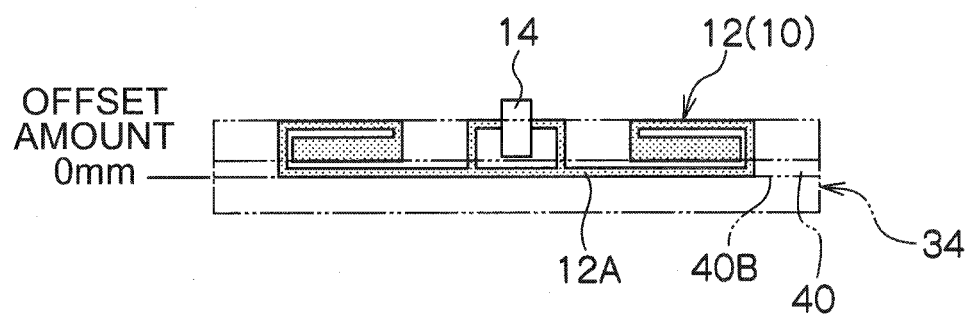
Figure 9C:
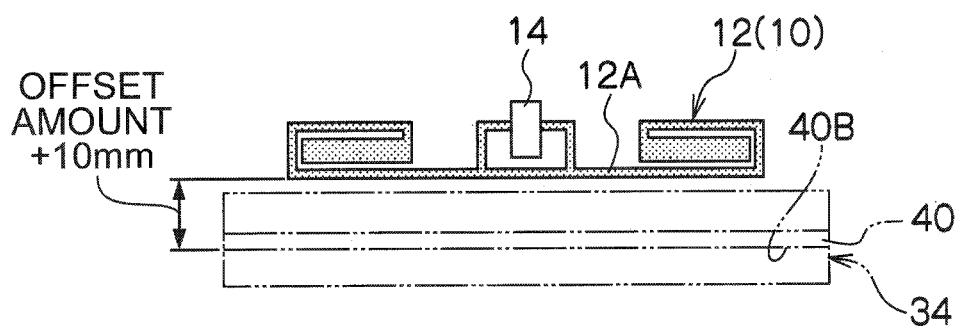
Figure 15A:
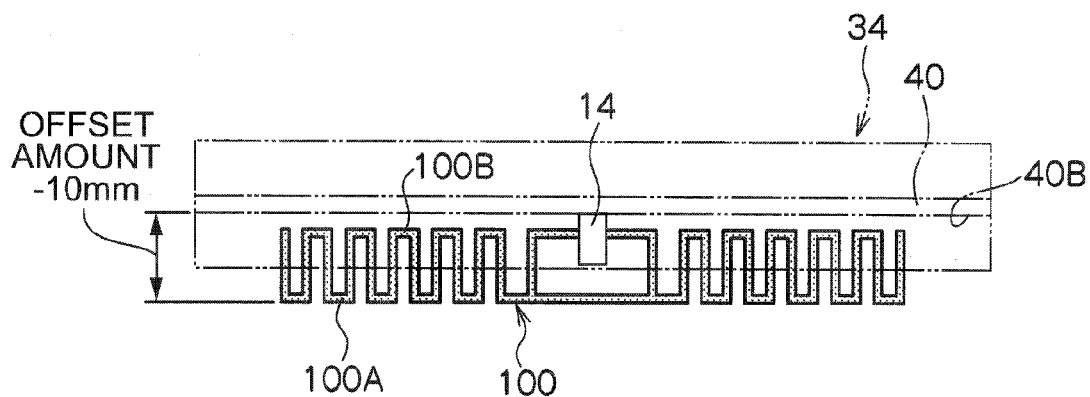
FIG. 15A through FIG. 15C are drawings showing models of a comparative example of the present invention using the numerical analysis of FIG. 7A, where
Figure 15B:
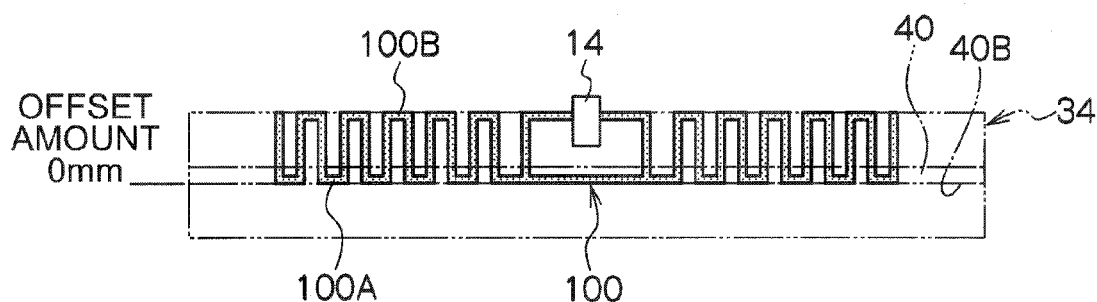
Figure 15C:
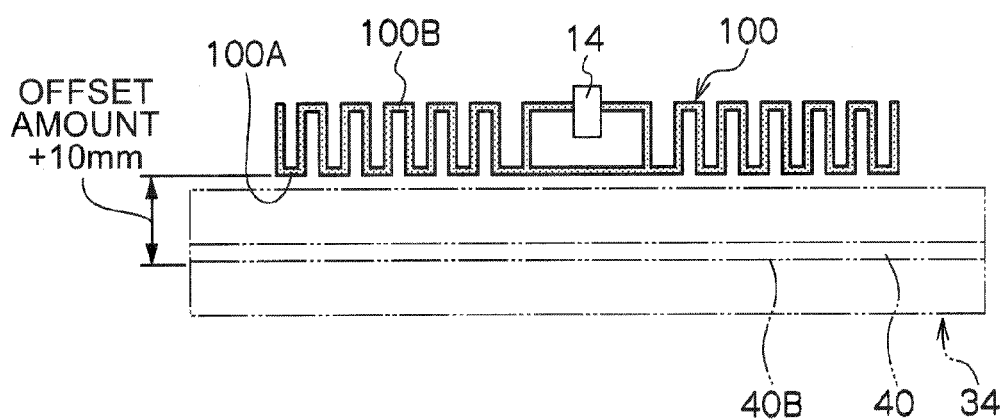
Figure 16A:
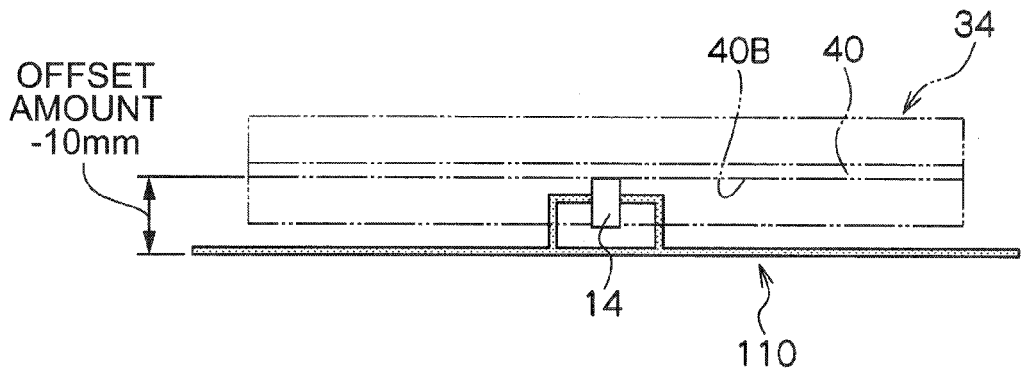
FIG. 16A through FIG. 16C are drawings showing models of a comparative example of the present invention using the numerical analysis of FIG. 7B, where
Figure 16B:
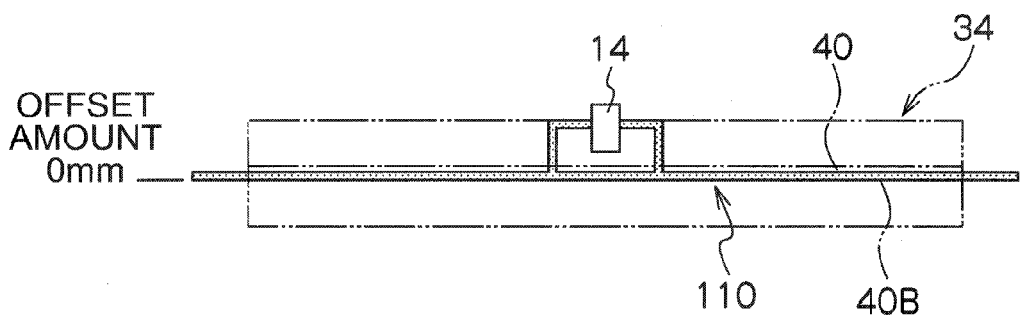
Figure 16C:
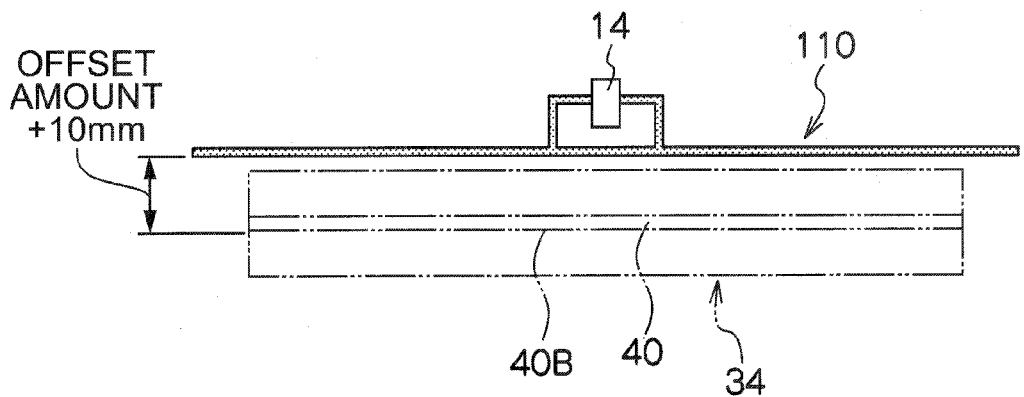

FIG. 7A shows the results of analysis of the antenna 100 as shown in FIG. 15A through FIG. 15C. As shown in FIG. 15A through FIG. 15C, the offset amount is defined as the distance to the one transverse direction end portion 100A of the antenna 100, with one transverse direction end portion 40B of the radiating section 40 being the reference. FIG. 7B shows the results of analysis of a rectilinear dipole antenna 110 relating to a comparative example as shown in FIG. 16A through FIG. 16C. As shown in FIG. 16A through FIG. 16C, the offset amount is defined in the same was as in the case of the antenna 100. Further, FIG. 7C shows the results of analysis of the tag antenna 12 relating to the first exemplary embodiment. As shown in FIG. 9A through FIG. 9C, the offset amount is defined as the distance to the main antenna portion 12A, with the one transverse direction end portion 40B of the radiating section 40 being the reference. FIG. 7D relates to a second exemplary embodiment that will be described later, and explanation thereof will be given later.

As shown in FIG. 7A, at the antenna 100, in the case of a distance of 5 mm, the sensitivity region is substantially −19 mm to +15 mm (a total 34 mm), and, in the case of a distance of 10 mm, the sensitivity region is substantially −21 mm to +17 mm (a total 38 mm). On the other hand, as shown in FIG. 7B, at the rectilinear dipole antenna 110, in the case of a distance of 5 mm, the sensitivity region is substantially −5 mm to +9 mm (a total 14 mm), and, in the case of a distance of 10 mm, the sensitivity region is substantially −7 mm to +13 mm (a total 20 mm).

In contrast, at the tag antenna 12, as shown in FIG. 7C, in the case of a distance of 5 mm, the sensitivity region is substantially −3 mm to +11 mm (a total 14 mm), and, in the case of a distance of 10 mm, the sensitivity region is substantially −6 mm to +15 mm (a total 21 mm). From these results, it can be understood that, at the tag antenna 12, the sensitivity region in the transverse direction is equivalent to the case of the rectilinear dipole antenna 110 that is substantially limited to a line width, and that the sensitivity region is markedly narrower than that of the antenna 100. FIG. 8A shows the sensitivity regions At in the transverse (conveying) direction of the antennas 100 as a schematic side view on the basis of the results of analysis of FIG. 7A. FIG. 8B shows the sensitivity regions At in the transverse direction of the tag antennas 12 as a schematic side view on the basis of the results of analysis of FIG. 7C. From comparing FIG. 8A and FIG. 8B, it is confirmed that, because the sensitivity region in the transverse direction of the tag antenna 12 is narrow at the RFID tag 10, the parallel interval of labels (RFIDs) that are adjacent in the conveying direction can be set to be small as described above as compared with RFIDs that are equipped with the antennas 100. Further, in each case, there is the trend that, the shorter the communication distance with the tag, the greater the ups and downs of the sensitivity distribution.

At the RFID tag 10 that is embedded in the label 20 affixed to the label area 28 of the recording tape cartridge 18, the dimensions of the tag antenna 12 are restricted by the label area 28, and, in light of the relationship with the communication frequency f, a simple rectilinear shape such as the dipole antenna 110 cannot be employed. However, by forming a meander line structure in the longitudinal direction as described above, a sensitivity distribution in the transverse direction that is equivalent to that of the dipole antenna 110 can be obtained.

Further, the plural RFID tags 10 that are parallel in the transverse direction are initialized individually by the reader/writer section 38 via the reader/writer antenna 34 whose directivity is ensured (refer to the region Ar at which communication is possible in FIG. 8A and FIG. 8B) due to the linear polarization plane substantially coinciding with the longitudinal direction of the tag antenna 12.

Namely, the reader/writer system 36 that is equipped with the reader/writer antenna 34 can individually initialize the numerous RFID tags 10 that are parallel in the conveying direction, without erroneously communicating with the other RFID tags 10. In particular, the RFID tag 10, that has the tag antenna 12 whose sensitivity distribution in the transverse direction is optimized as described above, can be initialized, for example, while still in the inlay 30. In this way, the parallel pitch of the RFID tags 10 can be made to be small in the state in which the labels 20 are parallel on the inlay 30 or the mount sheet 32 that is in the form of a roll or in the form of a sheet. Therefore, blank sheets of the base sheet 16, the mount sheet (release sheet) 32 and the labels 20, and a device for converting the pitch interval, and the like are not needed, and the manufacturing cost of the RFID tags 10 and the labels 20 can be reduced.

Moreover, the tag antenna 12 can, of course, carry out good communication due to mainly a vicinity of the main antenna portion 12A being activated with respect to radio waves from, for example, an unillustrated antenna for long-distance communication that generates circularly polarized waves. Namely, the tag antenna 12 realizes a structure that can handle well both short-distance and long-distance communications. Further, due to the currents, that are induced by the external electric field at the second folded-over antenna portions 12C that extend in the same direction as the main antenna portion 12A, being added, the sensitivity of the tag antenna 12 at specific portion in the transverse direction improves, which contributes to limiting the range at which communication is possible in short-distance communication.

Figure 6:
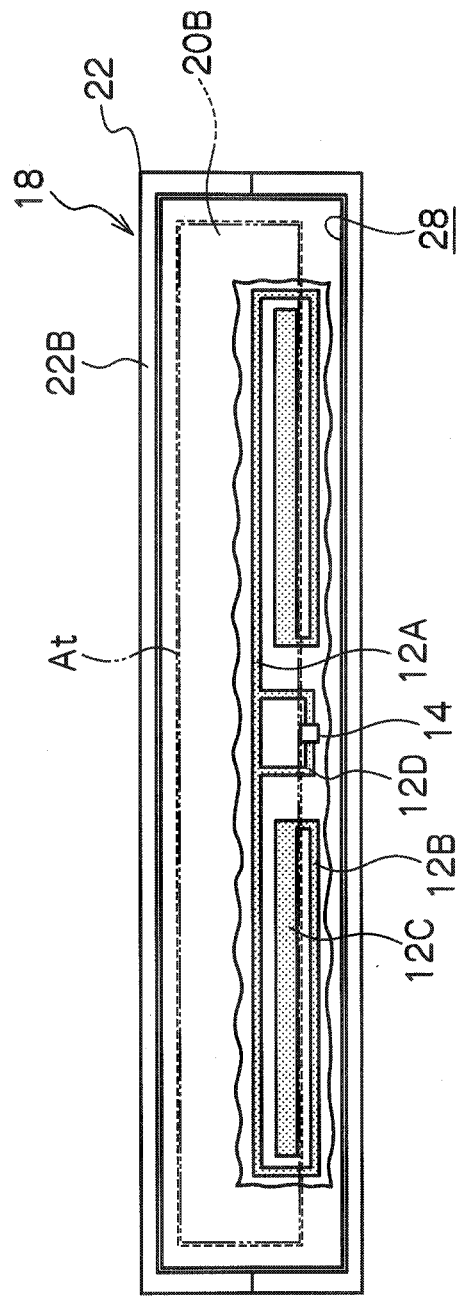
FIG. 6 is a rear view showing a state in which the label, that the RFID tag relating to the first exemplary embodiment of the present invention has been converted into, is affixed to a label area of the recording tape cartridge.

At the label 20, the printing area can be set to be wide because the IC chip 14 is disposed at a transverse direction end portion side. In the present exemplary embodiment, the range shown by the dashed line in FIG. 6 is a printable area 20B at which characters, symbols and the like can be written by printing or by handwriting by the user. Note that the region shown by the two-dot chain line in FIG. 6 shows the sensitivity region At obtained from the results of analysis of FIG. 7C, and, in the present exemplary embodiment, can be understood as being included within the range of the width of the label 20. Note that FIG. 6 illustrates a state in which a portion of the label sheet 20A is cut away such that the RFID tag 10 is exposed.

Next, another exemplary embodiment of the present invention will be described. Note that parts and portions that are basically the same as structures of the above first exemplary embodiment or that were previously mentioned are denoted by the same reference numerals as the structures of the above first exemplary embodiment or that were previously mentioned, and description thereof is omitted.

Second Exemplary Embodiment

Figure 10:
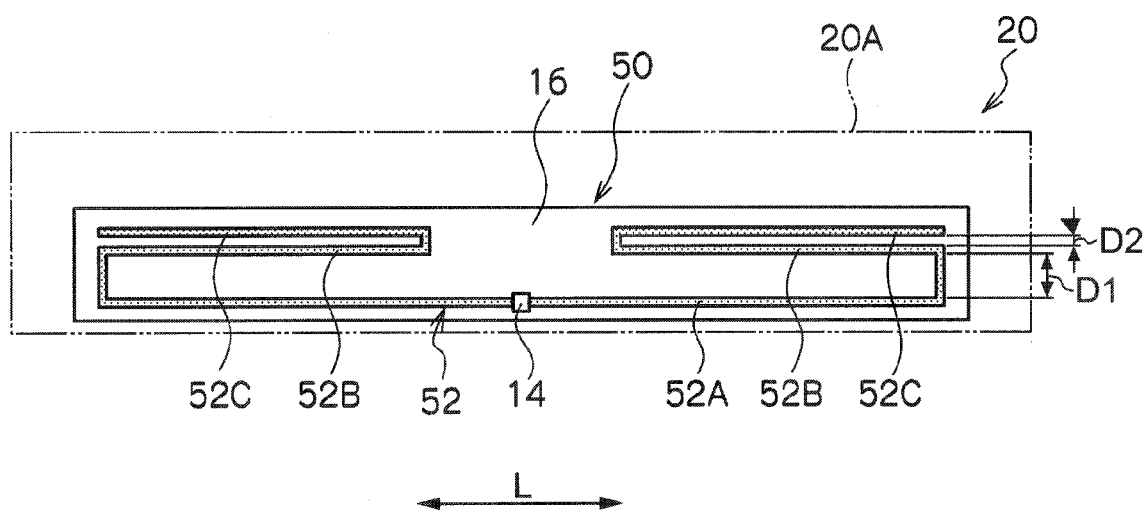
FIG. 10 is a front view showing an RFID tag relating to a second exemplary embodiment of the present invention.

An RFID tag 50 relating to another exemplary embodiment of the present invention is shown in FIG. 10 in a front view corresponding to FIG. 1. As shown in FIG. 10, the RFID tag 50 differs from the RFID tag 10 relating to the first exemplary embodiment with respect to the point that the RFID tag 50 has an antenna 52 instead of the tag antenna 12.

In the same way as the tag antenna 12, the antenna 52 is formed on the whole so as to be long in the longitudinal direction of the label 20 (the label area 28), and is folded-over plural times in the longitudinal direction thereof so as to form a meander line structure in the longitudinal direction. Concretely, the antenna 52 has a main antenna portion 52A that forms a rectilinear shape along the entire length of the longitudinal direction of the antenna 52, a pair of first folded-over antenna portions 52B that are folded-over from the longitudinal direction both ends of the main antenna portion 52A respectively toward the longitudinal direction central side so as to be parallel in the transverse direction to the main antenna portion 52A, and a pair of second folded-over antenna portions 52C that are folded-over from the end portions of the pair of first folded-over antenna portions 52B toward the longitudinal direction end portions of the antenna 52 so as to be parallel to the corresponding first folded-over antenna portion 52B over the entire length.

At the antenna 52, the parallel interval D1 (first predetermined interval) between the main antenna portion 52A and the first folded-over antenna portion 52B is set to be an interval that exceeds the parallel interval D2 (second predetermined interval) between the first folded-over antenna portion 52B and the second folded-over antenna portion 52C (D1>D2). In the present exemplary embodiment, the parallel interval D1 is set to exceed the width Wr of the radiating section 40 that structures the reader/writer antenna 34 (D1>Wr). On the other hand, the parallel interval D2 between the first folded-over antenna portion 52B and the second folded-over antenna portion 52C is set to be greater than or equal to 0.2 mm, and so as to be less than or equal to twice the width Wr of the radiating section 40 (D2$\leq$2×Wr). It is preferable to set the parallel interval D2 to be less than or equal to the width Wr of the radiating section 40 (D2$\leq$Wr), and in the present exemplary embodiment, D2≈Wr/2. Due thereto, when the antenna 52 receives irradiation of radio waves, the currents that are induced by the external electric field at the first folded-over antenna portions 52B and second folded-over antenna portions 52C, that extend in opposite orientations in the longitudinal direction, offset one another. Accordingly, the first folded-over antenna portions 52B and the second folded-over antenna portions 52C at the antenna 1 structure the folded-over antenna portions of the present invention. Further, at the antenna 52, because the parallel interval D1 exceeds the parallel interval D2 (D1>D2) as described above, the induced currents at the first folded-over antenna portions 52B due to the external electric field substantially do not affect the induced current at the main antenna portion 52A. Further, in the present exemplary embodiment, the pair of second folded-over antenna portions 52C are respectively folded-over toward the transverse direction outer sides of the antenna 52, i.e., the opposite sides of the main antenna portion 52A side.

Due thereto, at the antenna 52, the pair of second folded-over antenna portions 52C are parallel so as to be apart by more than the aforementioned parallel interval D1 (in the present exemplary embodiment, the width Wr of the radiating section 40) with respect to the main antenna portion 52A, and the currents induced by the external electric field at the pair of second folded-over antenna portions 52C do not contribute to an improvement in sensitivity. The antenna 52 differs from the tag antenna 12 with regard to this point.

Figure 11A:
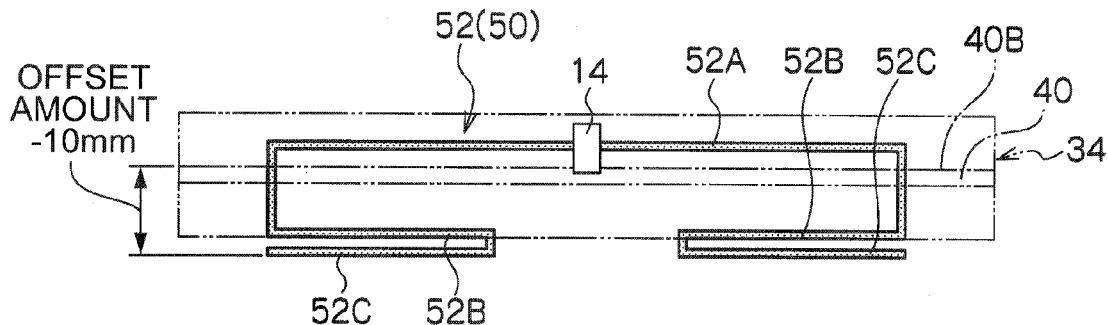
FIG. 11A through FIG. 11C are drawings showing models of the second exemplary embodiment of the present invention using the numerical analysis of FIG. 7D, where
Figure 11B:
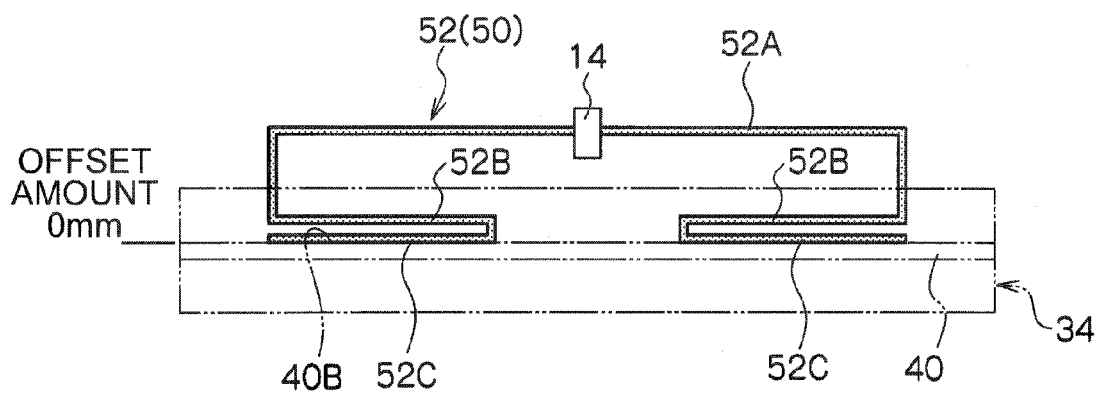
Figure 11C:
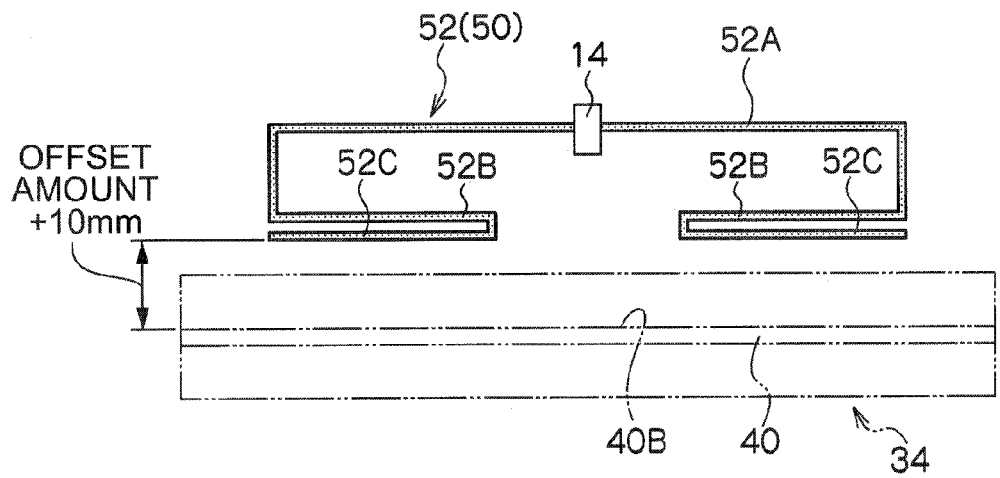

Further, the antenna 52 does not have a portion corresponding to the loop-shaped antenna portion 12D, and the IC chip 14 is disposed at the longitudinal direction central portion of the main antenna portion 52A. Therefore, at the RFID tag 50 that has the antenna 52, the main antenna portion 52A is, together with the IC chip 14, disposed at a transverse direction end portion side of the label sheet 20A and structures the label 20. Due to this difference in the placement of the IC chip 14 as compared with the RFID tag 10, in the numerical analysis of FIG. 7D that will be described hereinafter, the offset amount with respect to the radiating section 40 of the reader/writer antenna 34 is set as the distance of the second folded-over antenna portion 52C with respect to the one transverse direction end portion 40B of the radiating section 40 as shown in FIG. 11A through FIG. 11C. The other structures of the RFID tag 50 are the same as the corresponding structures of the RFID tag 10.

Accordingly, in accordance with the RFID tag 50 relating to the second exemplary embodiment as well, similar effects can be obtained by operation that is basically similar to that of the RFID tag 10, except for the effect of the currents induced by the external electric field at the pair of second folded-over antenna portions 12C contributing to an improvement in sensitivity of the tag antenna 12. Specifically, as shown in FIG. 7D, at the antenna 52, in the case of a distance of 5 mm, the sensitivity region is substantially −22 mm to −9 mm (a total 13 mm), and, in the case of a distance of 10 mm, the sensitivity region is substantially −23 mm to −7 mm (a total 16 mm). From these results, it can be understood that, at the antenna 52, the sensitivity region At is narrowed and the directivity is high, to the same extent or greater than those of the dipole antenna 110 and the tag antenna 12.

Third Exemplary Embodiment

Figure 12:
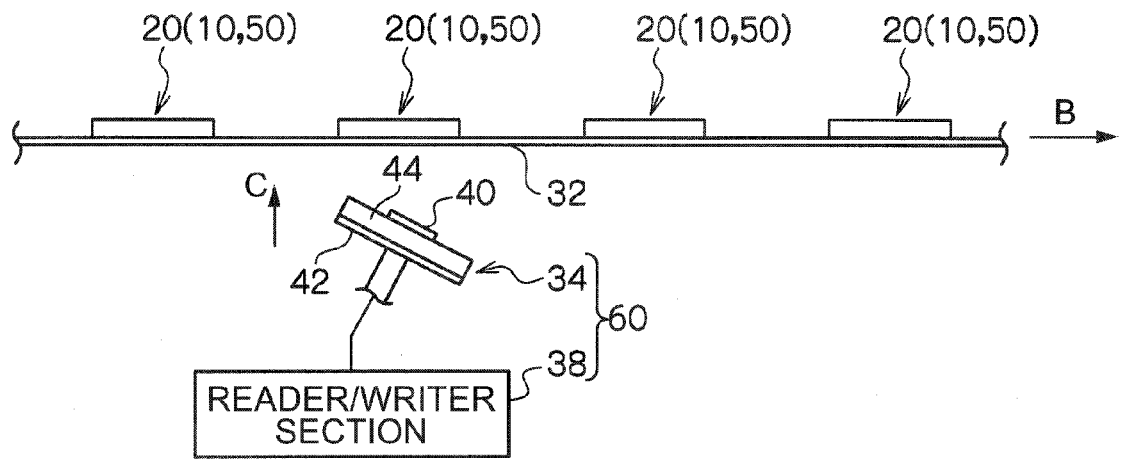
FIG. 12 is a side view schematically showing a reader/writer system relating to a third exemplary embodiment of the present invention.

A reader/writer system 60 relating to a third exemplary embodiment of the present invention is shown in a schematic side view in FIG. 12. As shown in FIG. 12, the reader/writer system 60 differs from the reader/writer system 36 with regard to the point that the radiating section 40, that is the radio wave radiating surface of the reader/writer antenna 34, is inclined, instead of the structure in which the radiating section 40 is disposed substantially parallel to the label 20 (the mount sheet 32).

Concretely, the reader/writer antenna 34 at the reader/writer system 60 is tilted such that the radiating section 40 is directed toward both the label 20 side (refer to arrow C) and the conveying direction downstream side (arrow B side) of the labels 20. Therefore, the region Ar at which communication is possible of the reader/writer antenna 34 is structured so as to be directed toward the conveying direction downstream side of the labels 20. Note that the angle of inclination of the reader/writer antenna 34 is preferably set such that the tag antenna 12 is positioned directly above the radiating section 40 (at the region Ar at which communication is possible) and such that a maximum sensitivity is brought about (the peaks of the reception sensitivities shown in FIG. 7A through FIG. 7D). Further, in consideration of the reception sensitivity distributions with respect to the offset amounts of the respective antennas of FIG. 7A through FIG. 7D, it is desirable to limit the orientation of the tag antenna 12 with respect to the conveying direction of the labels 20 (tags). Namely, the tag antenna 12 is desirably oriented such that the main antenna portion 12A of the tag antenna 12 is positioned at the leading side with respect to the conveying direction, and that the folded-over antenna portions (12B, 12C) follow thereafter. The other structures of the reader/writer system 60 are the same as the corresponding structures of the reader/writer system 36.

Accordingly, in accordance with the reader/writer system 60 relating to the third exemplary embodiment as well, similar effects can be obtained by operation that is basically similar to that of the reader/writer system 36 relating to the first exemplary embodiment. Further, at the reader/writer system 60, because the reader/writer antenna 34 is inclined as described above, erroneous communication with the RFID tag 10 that is positioned at the upstream side of the RFID tag 10 that is the object of initialization is more reliably prevented. In the case of initialization in particular, information for individuating has already been given to the RFID tag 10 at the downstream side, and (adverse effects due to) erroneous communication can thereby be avoided. Thus, by preventing erroneous communication with respect to the RFID tag 10 at the conveying direction upstream side that is easily adversely affected by erroneous communication, the probability of erroneous communication on the whole can be reduced.

Fourth Exemplary Embodiment

Figure 13:
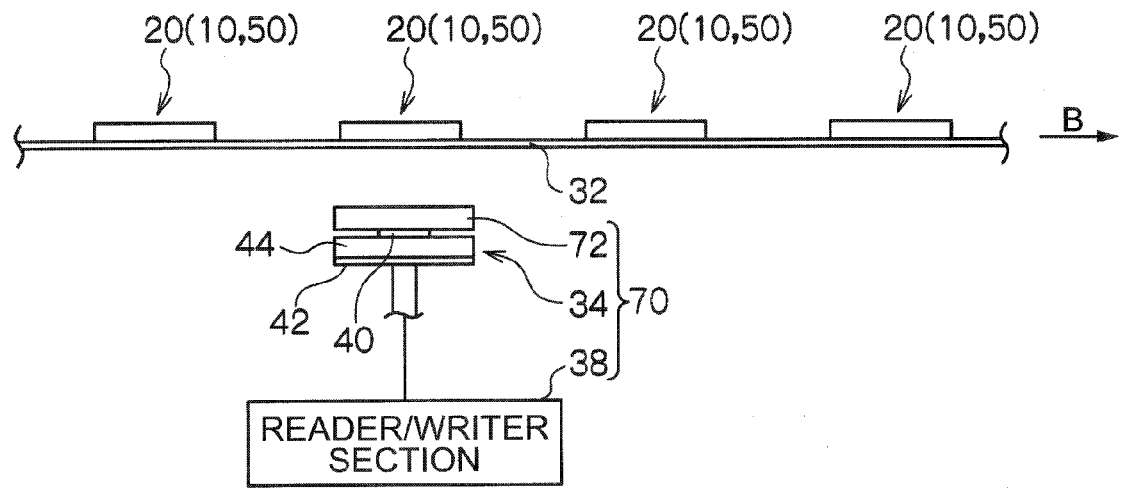
FIG. 13 is a side view schematically showing a reader/writer system relating to a fourth exemplary embodiment of the present invention.

A reader/writer system 70 relating to a fourth exemplary embodiment of the present invention is shown in a schematic side view in FIG. 13. As shown in FIG. 13, the reader/writer system 70 differs from the reader/writer system 36 with respect to the point that a dielectric layer 72 is provided at the radiating section 40 side that is the radio wave radiating surface of the reader/writer antenna 34.

The dielectric layer 72 is disposed in a vicinity of the radiating section 40 and adjusts the resonance frequency of the reader/writer antenna 34 with respect to the frequency of the radio waves irradiated onto the RFID tag 10 that is the object of initialization, i.e., the communication frequency f. For example, by using plural types of the dielectric layers 72 that are structured by materials having different permittivities, or plural types of the dielectric layers 72 that have the same permittivities and different thicknesses, plural communication frequencies f can be used. The other structures of the reader/writer system 70 are the same as the corresponding structures of the reader/writer system 36.

Accordingly, in accordance with the reader/writer system 70 relating to the fourth exemplary embodiment as well, similar effects can be obtained by operation that is basically similar to that of the reader/writer system 36 relating to the first exemplary embodiment. Further, at the reader/writer system 70, by using plural types of the dielectric layers 72 having different permittivities or thicknesses, plural types of the RFID tags 10 that have different communication frequencies f (total extended lengths Lt of the tag antennas 12) can be initialized at the common reader/writer antenna 34. Note that, at the reader/writer antenna 34, the length of the radiating section 40 and the dielectric constant of the dielectric layer 44 are set so as to be able to carry out initialization without using the dielectric layer 72 for one type of the plural types of RFID tags 10 having the different communication frequencies f.

Note that the fourth exemplary embodiment describes an example in which the dielectric layer 72 is disposed in a vicinity of the radiating section 40 and adjusts the resonance frequency of the reader/writer antenna 34 with respect to the frequency of the radio waves radiated onto the RFID tag 10, i.e., the communication frequency f. However, the present invention is not limited to the same. For example, the resonance frequency at the RFID tag 10 side can be adjusted by the dielectric layer 72. Due thereto, for example, the label 20 can be made to be the same resonance frequency as the resonance frequency in a case in which that label 20 is affixed to the case 22 of the recording tape cartridge 18 (the case material behaves as a dielectric). Further, the resonance frequency of the reader/writer antenna 34 and the resonance frequency of the RFID tag 10 can both be adjusted in accordance with the material, dimensions, arrangement, and the like of the dielectric layer 72.

Note that the above respective exemplary embodiments describe examples in which the tag antenna 12, 52 has one of each of the first folded-over antenna portion 12B, 52B that is folded-over from the longitudinal direction end portion toward the central portion, and the second folded-over antenna portion 12C, 52C that is folded-over from the longitudinal direction central portion toward the end portion. However, the present invention is not limited to the same, and the tag antenna 12, 52 may be structured to have a plurality of each of the first folded-over antenna portion 12B, 52B and second folded-over antenna portion 12C, 52C. In this case, there is the need to provide the same number of the first folded-over antenna portions 12B, 52B and second folded-over antenna portions 12C, 52C so as to negate the currents induced by the external electric field.

In a structure having the plural second folded-over antenna portions 12C, making the second folded-over antenna portion 12C, that is the closest to the main antenna portion 12A, be parallel to the main antenna portion 12A at an interval that is less than or equal to the width Wr can contribute to an improvement in the current (sensitivity) induced by the external electric field.

Further, the above respective exemplary embodiments show examples in which the label 20 using the RFID tag 10, 50 is applied to the recording tape cartridge 18. However, the present invention is not limited to the same, and can be applied to labels that are affixed to any of various types of products. In particular, the present invention is suitably applied to labels that are long in a predetermined direction and are to be affixed to the thickness portions of thin articles such as, for example, books, cases of CDs or DVDs, or the like. Moreover, the RFID tags 10, 50 are not limited to the use of being embedded in the labels 20. For example, the RFID tags 10, 50 may be directly attached to the inner surface or the inner wall of the case 22 structuring the recording tape cartridge 18, or may be applied to a non-contact-type card, or the like.

Still further, the above respective exemplary embodiments describe examples in which the reader/writer system 36, 60, 70 initializes the RFID tags 10 that are within the labels 20 conveyed via the mount sheet 32, but the present invention is not limited to the same. For example, the reader/writer system 36, 60, 70 may be structured so as to carry out communication such as inspection of the RFID tags 10, or merely reading and writing (or either one) of information from and to the IC chips 14, or the like.

Moreover, the reader/writer system 36, 60, 70 is not limited to a structure that carries out communication with the labels 20 (the RFID tags 10) that are in the midst of the manufacturing process, and can also be used in applications of carrying out communication individually with, for example, the labels 20 that are affixed to plural books (spines) or CD cases or the like that are lined-up at a bookshelf or shelf, or the labels 20 that are affixed to the label areas 28 of the plural recording tape cartridges 18 that are held or directly stacked in a holder of a library device. In such cases as well, because the region Ar at which communication is possible of the above-described reader/writer antenna 34 is narrow, good communication with the label 20 that is the object of communication can be carried out without causing erroneous communication (interference) with the labels 20 other than the label 20 that is the object of communication. In particular, because the sensitivity region At of the RFID tag 10 (tag antenna 12) shown in FIG. 7C is positioned within the range of the thickness of the recording tape cartridge 18 (refer to the two-dot chain line in FIG. 6), interference can be effectively prevented or suppressed even when communicating with the labels 20 of recording tape cartridges 18 that are stacked directly.

Further, in the communication of the reader/writer system 36, 60, 70, because the region Ar at which communication is possible of the reader/writer antenna 34 is narrow, a sensitivity region guide for causing the region Ar at which communication is possible to be recognized may be provided. A light guide that illuminates light onto the region Ar at which communication is possible can be used as the sensitivity region guide. In this structure, if visible light is employed, the region Ar at which communication is possible can be recognized even by the naked eye (can be discerned visually). Therefore, when a user, in a state of holding (at least the reader/writer antenna 34 of) the reader/writer system 36, 60, 70, carries out communication individually with, for example, the labels 20 that are affixed to plural books (spines) or CD cases or the like that are lined-up at a bookshelf or shelf, or the labels 20 that are affixed to the label areas 28 of the plural recording tape cartridges 18 that are held or directly stacked in a holder of a library device as described above, the user can easily recognize the region Ar at which communication is possible, and the usability improves.

In addition, by lining-up, at uniform intervals, a plurality of these reader/writer systems 36 that have been specialized for short-distance wireless (non-contact) communication, collective initialization can be carried out, without interference, on the plural RFID tags 10 of the mount sheet 32 or the labels 20 that are affixed to the label areas 28 of the plural recording tape cartridges 18 that are stacked.

What is claimed is:

1. A communication antenna formed in a flat-plate-shape overall, for carrying out communication with an RFID tag, the communication antenna comprising:

a ground layer formed at one surface of the communication antenna over substantially an entire surface; and a rectangular radiating section formed in a rectangular shape at another surface of the communication antenna, and having, at about a central portion in a longitudinal direction of the radiating section, a single feed point that passes through the ground layer, wherein a width of the radiating section in a direction forming a right angle with the longitudinal direction of the radiating section is greater than or equal to 0.3 mm and less than 10 mm, and an interval between the radiating section and the ground layer is greater than or equal to $1/512$ and less than $1/64$ of a wavelength of radio waves used in communication.

2. An RFID tag comprising:

an element for communication; and a tag antenna formed by being folded-over a plurality of times in a longitudinal direction of the tag antenna at both sides in the longitudinal direction so as to be symmetrical with respect to the element for communication, the tag antenna having a main antenna portion extending in a rectilinear form over substantially an entire length in the longitudinal direction, and having, at portions extending in mutually different orientations of the longitudinal direction, folded-over antenna portions at which currents induced by an external electric field offset one another, the tag antenna being structured such that the main antenna portion and the folded-over antenna portions are parallel in a transverse direction, wherein the main antenna portion extends in the rectilinear form over substantially the entire length in the longitudinal direction at one end side in the transverse direction, wherein each of the folded-over antenna portions comprises:

a first folded-over antenna portion that is folded-over from an end portion in the longitudinal direction toward a longitudinal direction central side, and is disposed parallel to the main antenna portion at a first predetermined interval, and a second folded-over antenna portion that is folded-over from a central side in the longitudinal direction toward a longitudinal direction end portion side, and is disposed parallel to the first folded-over antenna portion at a second predetermined interval that is less than the first predetermined interval, and wherein the second predetermined interval is less than or equal to two times a width dimension of a radiating section that structures an antenna that is a partner in short-distance communication and at which a single feed point is set at a central portion in a predetermined longitudinal direction.

3. The RFID tag of claim 2, wherein, at the tag antenna, the second folded-over antenna portions are disposed parallel to the main antenna portion at an interval of less than the first predetermined interval.

4. The RFID tag of claim 2, wherein the tag antenna has, at a central portion of the main antenna portion, a loop-shaped antenna portion that commonly has a portion of the main antenna portion, and the element for communication is on the loop-shaped antenna portion and is set at a position that is different than the main antenna portion.

5. A non-contact communication device for carrying out communication in a non-contact state with an RFID tag, the device comprising:

a communication antenna formed in a flat-plate-shape overall, for carrying out communication with the RFID tag, the communication antenna having a ground layer that is formed at one surface of the communication antenna over substantially an entire surface, and a rectangular radiating section that is formed in a rectangular shape that is long in a predetermined direction at another surface of the communication antenna, and having, at about a central portion in a longitudinal direction of the radiating section, a single feed point that passes through the ground layer, wherein a width of the radiating section in a direction forming a right angle with the longitudinal direction of the radiating section is greater than or equal to 0.3 mm and less than 10 mm, wherein an interval between the radiating section and the ground layer is greater than or equal to $1/512$ and less than $1/64$ of a wavelength of radio waves used in communication, and wherein the communication antenna is disposed such that the longitudinal direction of the radiating section coincides with a longitudinal direction of the main antenna portion of the RFID tag; and a communicating section carrying out communication with the RFID tag via the communication antenna, when the radiating section of the communication antenna is near the tag antenna.

6. The non-contact communication device of claim 5, further comprising a conveying device that conveys a plurality of the RFID tags, that are parallel in a transverse direction, such that the plurality of the RFID tags successively pass a region at which communication is possible via the communication antenna, wherein the communicating section is structured so as to, via the communication antenna, carry out communication individually with the RFID that passes the region at which communication is possible.

7. A non-contact communication device for carrying out communication in a non-contact state with an RFID tag, the device comprising:

a communication antenna formed in a flat-plate-shape overall, for carrying out communication with the RFID tag, the communication antenna having a ground layer that is formed at one surface of the communication antenna over substantially an entire surface, and a rectangular radiating section that is formed in a rectangular shape that is long in a predetermined direction at another surface of the communication antenna, and having, at about a central portion in a longitudinal direction of the radiating section, a single feed point that passes through the ground layer, wherein a width of the radiating section in a direction forming a right angle with the longitudinal direction of the radiating section is greater than or equal to 0.3 mm and less than 10 mm, wherein an interval between the radiating section and the ground layer is greater than or equal to $1/512$ and less than $1/64$ of a wavelength of radio waves used in communication, and wherein the communication antenna is disposed such that the longitudinal direction of the radiating section coincides with a longitudinal direction of the main antenna portion of the RFID tag;

a communicating section carrying out communication with the RFID tag via the communication antenna, when the radiating section of the communication antenna is near the tag antenna; and a conveying device that conveys a plurality of the RFID tags, that are parallel in a transverse direction, such that the plurality of the RFID tags successively pass a region at which communication is possible via the communication antenna, wherein the communicating section is structured so as to, via the communication antenna, carry out communication individually with the RFID that passes the region at which communication is possible, wherein the communication antenna is disposed at an incline so as to be oriented toward both an RFID side and a downstream side in a conveying direction by the conveying device.

8. A non-contact communication method that carries out communication in a non-contact state individually with one of a plurality of RFID tags that each have a tag antenna that is long in a predetermined direction and that are parallel in a transverse direction that forms a right angle with a longitudinal direction of the tag antenna, the method comprising:

placing a communication antenna according to claim 1, such that the longitudinal direction of the radiating section coincides with the longitudinal direction of the tag antenna;

causing the radiating section to approach one RFID tag among the plurality of RFID tags; and carrying out communication individually with the one of the plurality of RFID tags.

\* \* \* \* \*